United States Patent
Lewbel

(10) Patent No.: US 11,314,408 B2
(45) Date of Patent: Apr. 26, 2022

(54) COMPUTATIONALLY EFFICIENT HUMAN-COMPUTER INTERFACE FOR COLLABORATIVE MODIFICATION OF CONTENT

(71) Applicant: MICROSOFT TECHNOLOGY LICENSING, LLC, Redmond, WA (US)

(72) Inventor: Hannah Rebecca Lewbel, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/112,684

(22) Filed: Aug. 25, 2018

(65) Prior Publication Data

US 2020/0064997 A1    Feb. 27, 2020

(51) Int. Cl.
*G06F 3/0488* (2013.01)
*G06F 40/169* (2020.01)
*G06F 40/106* (2020.01)
*G06F 3/0481* (2013.01)
*G06N 20/00* (2019.01)
*G06F 3/04883* (2022.01)
*G06F 3/04815* (2022.01)

(52) U.S. Cl.
CPC ...... *G06F 3/04883* (2013.01); *G06F 3/04815* (2013.01); *G06F 40/106* (2020.01); *G06F 40/169* (2020.01); *G06N 20/00* (2019.01)

(58) Field of Classification Search
CPC .. G06F 3/04883; G06F 17/241; G06F 17/212; G06F 3/04815; G06F 40/169; G06F 40/106; G06N 20/00; G06Q 10/00
See application file for complete search history.

(56) References Cited

U.S. PATENT DOCUMENTS 8,204,890 B1    6/2012  Gogan
8,321,361 B1 *  11/2012 Heath .............. G06Q 10/10
                                                  706/45

(Continued)

OTHER PUBLICATIONS

Pazzani, et al., "A Framework for Collaborative, Content-Based and Demographic Filtering", In Journal of Artificial Intelligence Review, vol. 13, Issue 5-6, Dec. 1999, pp. 393-408.

(Continued)

*Primary Examiner* — Daniel W Parcher
(74) *Attorney, Agent, or Firm* — Scott Y. Shigeta; Newport IP, LLC

(57) ABSTRACT

Technologies are disclosed that enable a computing system to collect and process user preferences regarding content that is shared in a collaborative workspace. By the use of an input gesture, individual users of a multi-user sharing session can provide a vote for a portion of content indicating that they favor ("up-vote") or disfavor ("down-vote") the content. The system can collect and analyze the votes from each user. The system can then modify the content based on the votes. Modifications to the content can include, but are not limited to, rearranging selected portions of the content, generating annotations, generating one or more UI elements that bring focus to portions of the content, identifying high-priority content or low-priority content, or deleting portions of the content.

15 Claims, 19 Drawing Sheets

(56) References Cited

U.S. PATENT DOCUMENTS

| | | |
|---|---|---|
| 8,548,996 B2 | 10/2013 | Tareen et al. |
| 8,806,354 B1 | 8/2014 | Hyndman et al. |
| 9,021,370 B1 | 4/2015 | Carlson |
| 9,224,175 B2 | 12/2015 | Frank et al. |
| 9,690,403 B2 | 6/2017 | Kreek et al. |
| 2003/0095724 A1* | 5/2003 | Kia ............... B41J 2/17503 382/313 |
| 2004/0104935 A1* | 6/2004 | Williamson ......... G06F 3/012 715/757 |
| 2005/0120308 A1* | 6/2005 | Gibson ............. G06F 9/451 715/779 |
| 2006/0090138 A1* | 4/2006 | Wang ............. G06F 3/0489 715/760 |
| 2008/0028294 A1 | 1/2008 | Sell et al. |
| 2008/0189609 A1 | 8/2008 | Larson et al. |
| 2009/0327054 A1* | 12/2009 | Yao ............... G06Q 10/10 705/12 |
| 2010/0083109 A1 | 4/2010 | Tse et al. |
| 2012/0005131 A1* | 1/2012 | Horvitz ............ G06N 5/043 706/11 |
| 2013/0254160 A1* | 9/2013 | Rose ............. G06F 16/248 707/609 |
| 2014/0143831 A1 | 5/2014 | Fieweger |
| 2014/0207622 A1* | 7/2014 | Vijayaraghavan ......... G06Q 30/0631 705/26.62 |
| 2014/0210734 A1 | 7/2014 | Windbrake et al. |
| 2014/0354624 A1* | 12/2014 | Chaji .............. G06F 1/3265 345/212 |
| 2014/0380193 A1* | 12/2014 | Coplen ........... G06F 3/04847 715/753 |
| 2015/0039405 A1 | 2/2015 | Frank et al. |
| 2015/0135300 A1 | 5/2015 | Ford |
| 2017/0287074 A1* | 10/2017 | Aber .............. G06Q 40/04 |
| 2017/0309193 A1 | 10/2017 | Joseph et al. |
| 2018/0293320 A1* | 10/2018 | Melik ............ G06Q 10/101 |

OTHER PUBLICATIONS

"International Search Report and Written Opinion Issued in PCT Application No. PCT/US19/038840", dated Sep. 6, 2019, 12 Pages.

* cited by examiner

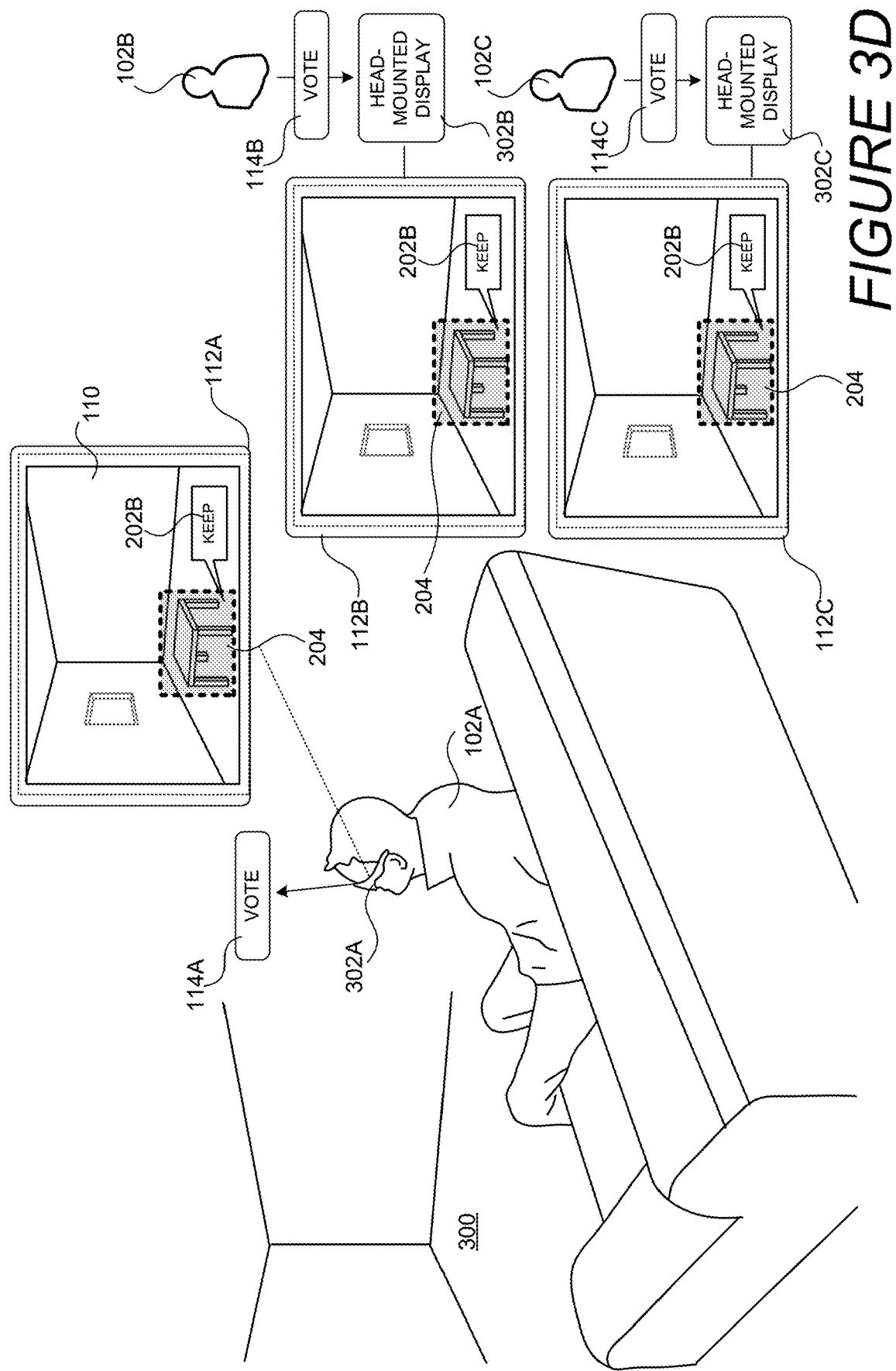

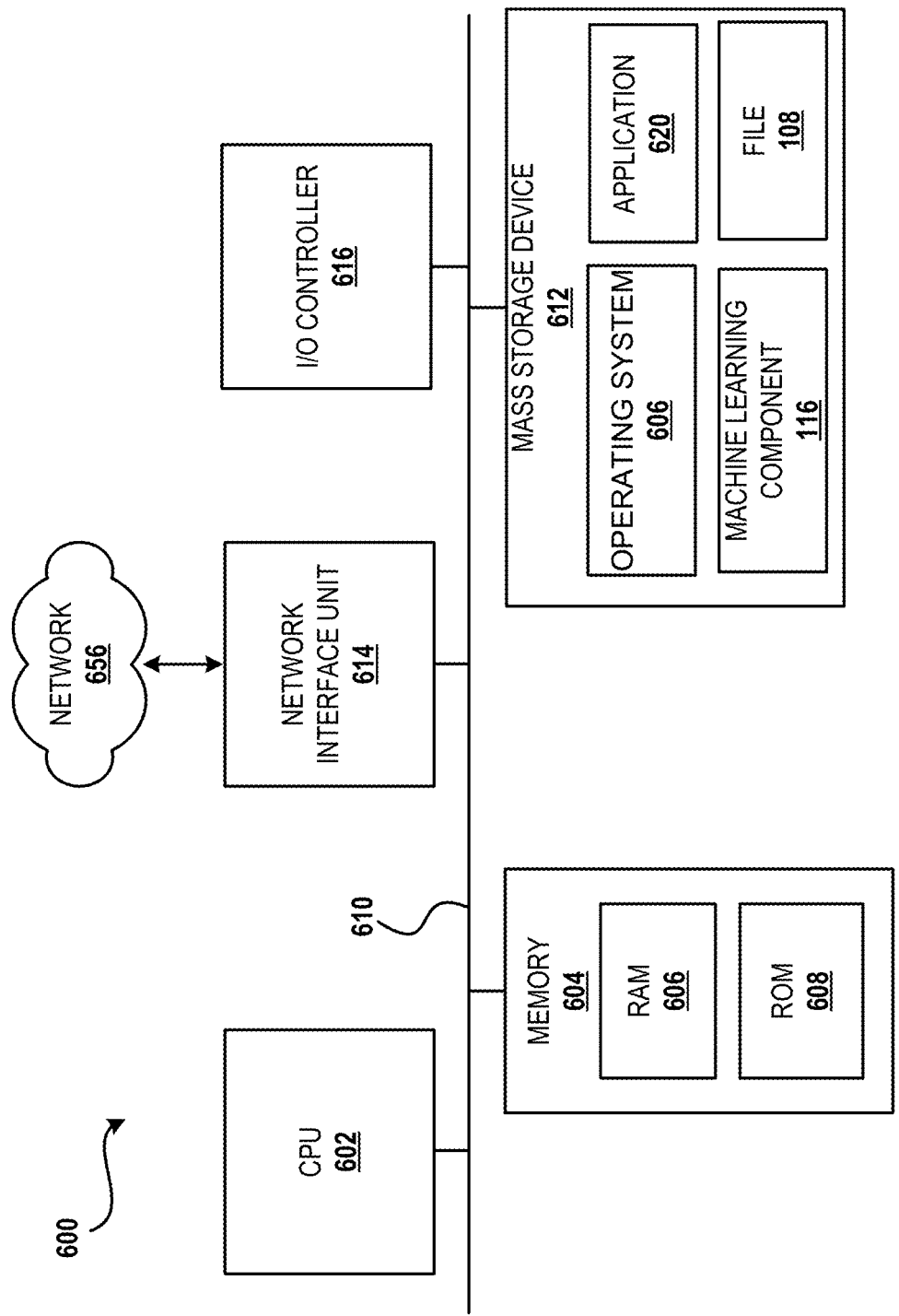

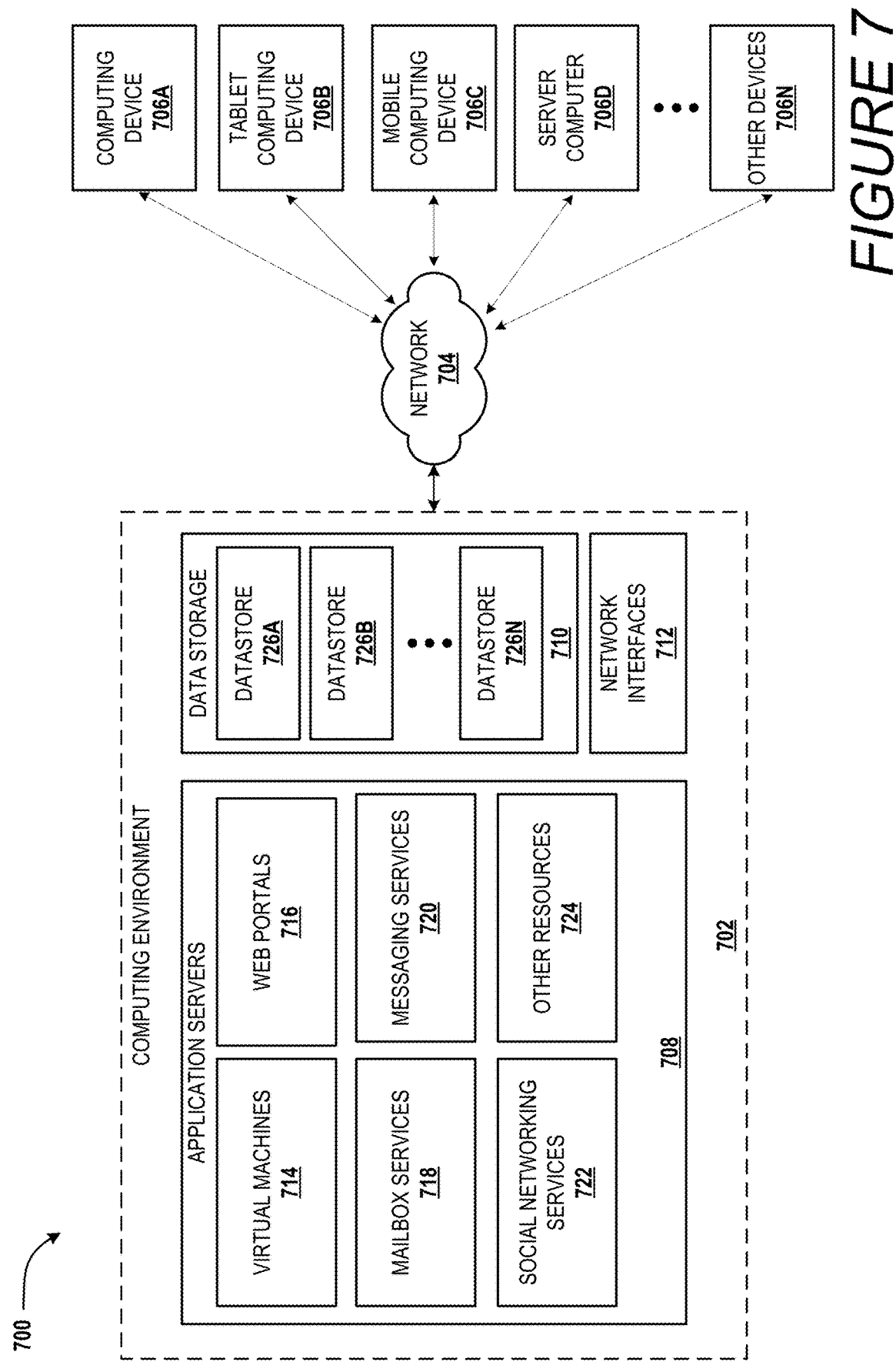

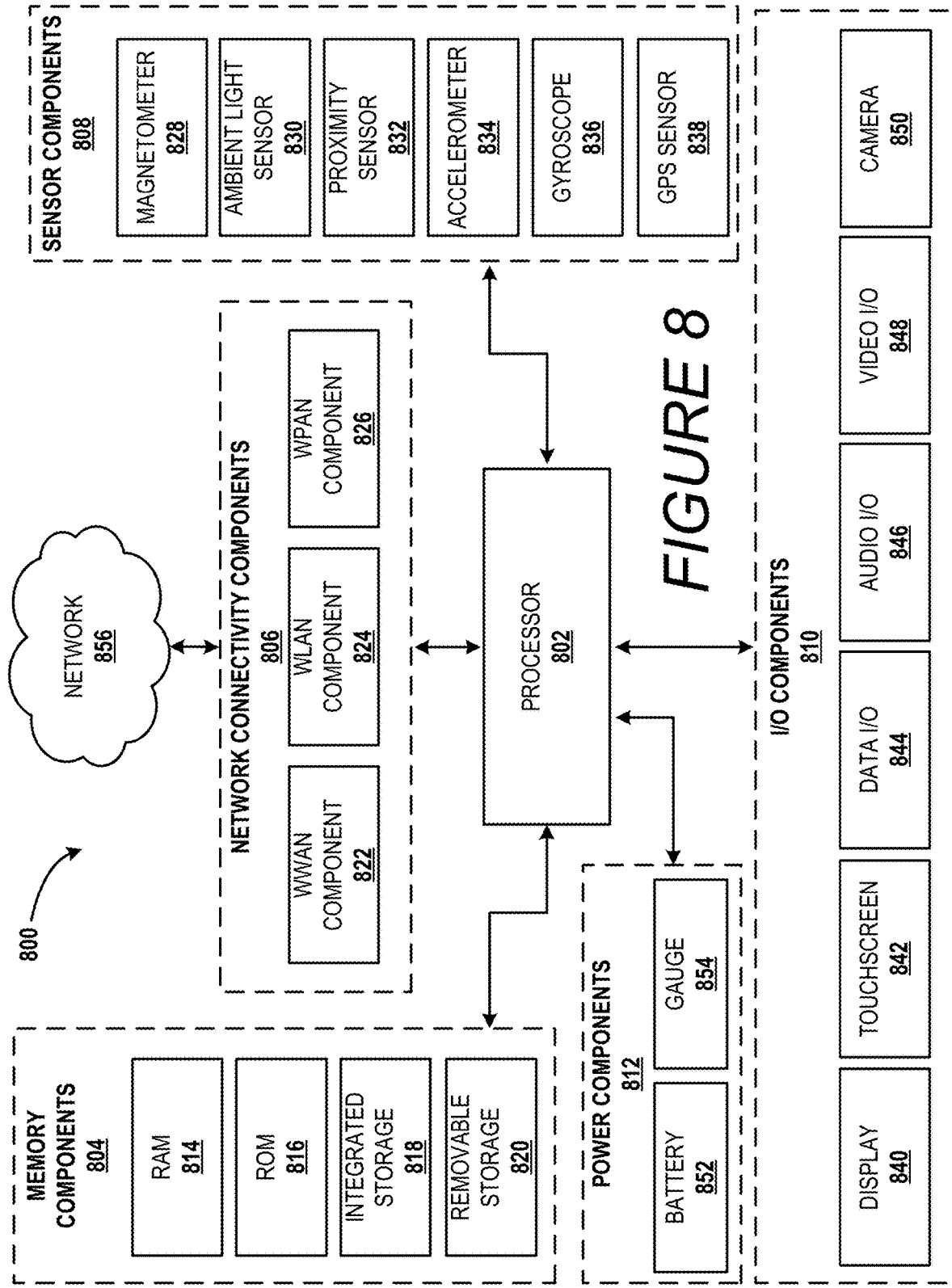

COMPUTATIONALLY EFFICIENT HUMAN-COMPUTER INTERFACE FOR COLLABORATIVE MODIFICATION OF CONTENT

BACKGROUND

Many productivity applications provide specialized tools for displaying and manipulating the contents of a file. Some productivity applications also allow multiple users to collaborate within a shared workspace, an environment where multiple users can simultaneously view and edit the contents of a file. For example, some environments provide a digital whiteboard for multiple users to manipulate whiteboard objects, such as digital ink expressions, etc.

Although existing productivity applications can provide specialized functions for manipulating content, existing productivity applications do not provide a satisfactory user experience when a workflow requires a group of users to come to a consensus regarding content. In a multi-user collaborative workspace, for example, when group consensus is needed, users usually contribute individually by providing manual edits to the content. Such methods may be uncoordinated as some efforts can conflict with one another. Some users might also coordinate by the use of a shared communications session, but such efforts are still inefficient with respect to computing resources, e.g., multiple channels of communication may be needed. Moreover, when consensus is needed, existing systems can be inefficient because users are still required to manually edit the contents of a file even after a group makes a decision regarding the content.

SUMMARY

The technologies disclosed herein provide a computationally efficient human-computer interface for collaborative modification of content. Among other technical benefits, the technologies disclosed herein can reduce utilization of computing resources by simplifying the collaborative process for modifying content in a multi-user collaborative workspace. For example, when using the disclosed technologies, individual users of a multi-user sharing session can provide a vote for a portion of content indicating that they favor ("up-vote") or disfavor ("down-vote") the content. Votes can then be collected from each user, analyzed, and the content can be modified based on the votes. By modifying the content based upon the votes, the need for users to manually edit content and to coordinate editing efforts can be reduced or eliminated. This can reduce the utilization of computing resources like processor cycles, memory, network bandwidth, and power.

In order to provide the technical benefits described above, and potentially others, a system is provided that enables users to participate in a multi-user sharing session. The multi-user sharing session might, for example, be implemented as a digital whiteboard presenting whiteboard objects such as, but not limited to, handwriting or hand-drawn images such as digital ink created using a digital pen or touchscreen. The multi-user sharing session can also be implemented as a three-dimensional ("3D") collaborative workspace presenting virtual objects displayed in a mixed reality computing environment in other configurations. The technologies disclosed herein can be implemented with other types of multi-user sharing sessions in other configurations.

Users can access the multi-user sharing session utilizing client computing devices configured with an appropriate client application. The client application can present content to the users such as, for example, on display devices connected to the client computing devices. The content might be, for example, a digital whiteboard, virtual objects, a word processing document, a spreadsheet document, a presentation document, an image or video, or another type of content. The content can be stored in a file on a server computer and distributed to the client computing devices participating in the multi-user sharing session.

Users participating in a multi-user sharing session can provide input gestures to the client application executing on the client devices in order to vote on portions of the displayed content. The input gestures made by the users indicate a preference for a portion of the displayed content. For example, and without limitation, a user might provide an input gesture indicating that they favor ("up-vote") or disfavor ("down-vote") a portion of the displayed content.

A server computer, or other computing device operating as a part of the disclosed system, can collect the votes from the users in the multi-user sharing session. The server computer can then analyze the votes to determine a priority for a portion of the content. The server computer can then modify the content based on the priority for the portion of the content by rearranging the content, deleting the portion of the content if a priority for the portion of the content does not exceed a threshold, generating an annotation indicating the preference for the portion of the content, or adding a user interface ("UI") element to the content to bring focus to the portion of the content if a priority for the portion of the content exceeds a threshold. An audio output can also be used to bring focus to a portion of the content. For example, a voice instruction can be generated to describe a portion of content and one or more results related to the determined priority or the votes. The server computer can modify the content in other ways based upon the priority associated with portions of the content in other configurations. The server computer can also generate a report that indicates the user preferences for portions of the content and that provides other information regarding the voting.

In some configurations, the server computer applies weights to the votes received from the users in a multi-user sharing session prior to determining the priority for a portion of the content. The weighting can be based on contextual data (a "context") associated with each of the of users such as, but not limited to, a user's role in an organization or a user's past voting history.

In some configurations, a machine learning component can vote on portions of the content in addition to user votes. The machine learning component can be trained to vote on content based upon users' previous votes, the type of content being voted on, data relating to the content being voted on, the results of previous votes on particular types of content, and/or other types of data.

In addition to those technical benefits discussed above, implementations of the disclosed technologies can result in improved human-computer interaction during a multi-user sharing session and editing of content. This can reduce the likelihood of inadvertent user input and thus save computing resources, such as memory resources, processing resources, and networking resources. The reduction of inadvertent inputs can also reduce a user's time interacting with a computer, reduce the need for redundant editing of content, redundant entries for selecting content to be edited, redundant entries for pasting and transferring edited content to other users. Other technical benefits not specifically mentioned herein can also be realized through implementations of the disclosed subject matter.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 3D shows how virtual content can be modified based upon votes provided by the users of a 3D collaborative workspace.

FIG. 6 is a computer architecture diagram illustrating an illustrative computer hardware and software architecture for a computing system capable of implementing aspects of the techniques and technologies presented herein.

FIG. 7 is a diagram illustrating a distributed computing environment capable of implementing aspects of the techniques and technologies presented herein.

FIG. 8 is a computer architecture diagram illustrating another computing device architecture for a computing device capable of implementing aspects of the techniques and technologies presented herein.

DETAILED DESCRIPTION

The Detailed Description discloses aspects of a system that provides a computationally efficient interface for the collaborative modification of content. As discussed briefly above, the disclosed system can collect and process user preferences regarding content that is shared in a collaborative workspace. By the use of an input gesture, individual users of a multi-user session can indicate a selection of content of a file and provide a vote indicating that they favor ("up-vote") or disfavor ("down-vote") the selected content. The system can collect and analyze the votes from each user. The system can then modify the contents of the file based on the votes.

By modifying the content based upon the votes, the need for users to manually edit content and to coordinate editing efforts can be reduced or eliminated. User interaction with a computing device can also be improved by enabling users to utilize simplified gestures for selecting specified portions of content and providing an input with an indication that an individual user favors or disfavors the selected content. This can reduce the utilization of computing resources like processor cycles, memory, network bandwidth, and power. Other technical benefits not specifically mentioned herein can be realized through implementations of the disclosed technologies.

Figure 1A:
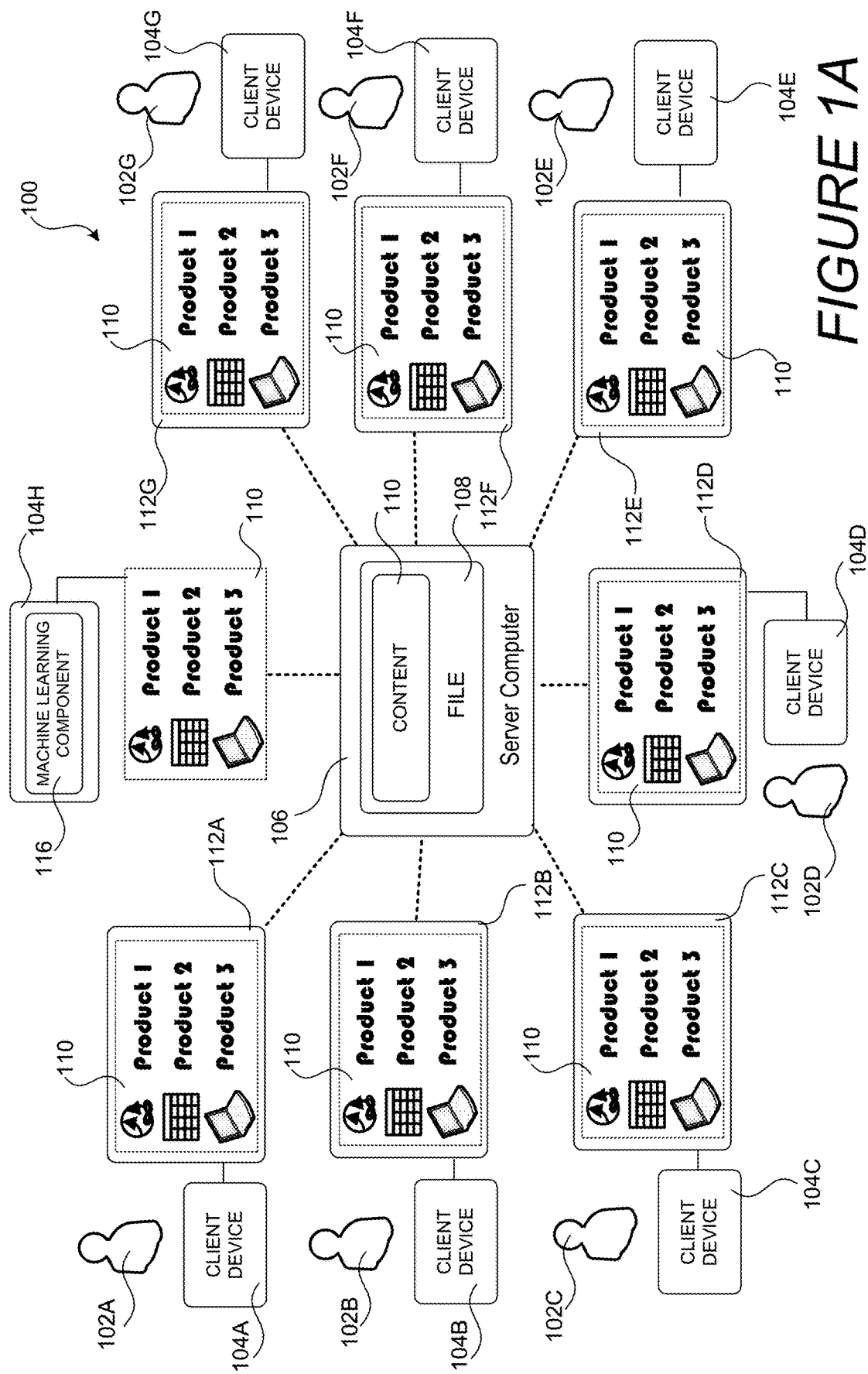
FIG. 1A is a block diagram of a system for providing a computationally efficient human-computer interface for collaborative modification of content.

FIG. 1A is a block diagram of a system for providing a computationally efficient human-computer interface for collaborative modification of content. The exemplary system shown in FIG. 1A can provide a collaborative whiteboard where multiple users can view content in a file and simultaneously provide input to manipulate the content. Implementations of the disclosed technologies such as the example system shown in FIG. 1A can reduce or eliminate the need for users to manually enter edits to the contents of a file in a multi-user sharing session. Additional details regarding these aspects will be presented below.

As illustrated in FIG. 1A, a system 100 is configured to enable users 102A-102H (which might be referred to collectively as the "users 102" or individually as a "user 102") to participate in a multi-user sharing session. The multi-user sharing session might, for example, be implemented as a digital whiteboard presenting whiteboard objects such as, but not limited to, handwriting or hand-drawn images such as digital ink created using a digital pen or touchscreen. The multi-user sharing session can also be implemented as a 3D collaborative workspace presenting virtual objects displayed in a mixed reality computing environment in another configuration. Additional details regarding one such 3D collaborative workspace will be provided below with respect to FIGS. 3A-3D.

It is to be appreciated that the technologies disclosed herein can be utilized with any type of collaborative platform such as, but not limited to, collaborative whiteboards, 3D collaborative workspaces, and collaborative editing sessions of documents such a spreadsheet, word processing document, etc. Accordingly, the configurations described herein are not limited to use with a specific collaboration platform.

The users 102A-102G can access the multi-user sharing session utilizing client computing devices 104A-104G (which might be referred to collectively as the "computing devices 104" or individually as a "computing device 104"), respectively, configured with an appropriate client application (not shown in FIG. 1A). The client application can present content 110 to the users 102A-102G such as, for example, on display devices 112A-112G connected to the client computing devices 102A-102G, respectively.

The content 110 might be, for example, a digital whiteboard, virtual objects, a word processing document, a spreadsheet document, a presentation document, an image or video, or another type of content. In the example shown in FIGS. 1A-1C, the content 110 is a digital whiteboard containing several portions identifying different products (i.e. product 1, product 2, and product 3).

The content 110 can be stored in a file 108 on a server computer 106, or in another networked location, and distributed to the client computing devices 104 participating in the multi-user sharing session via a communications network. The file 108 containing the content 110 might also be stored on one of the client devices 104 and shared to the other client devices 104 in other configurations. The content 110 can be provided to the client devices 110 in other ways in other configurations.

As shown in FIG. 1A, the content 110 can also be provided to a machine learning component 116 executing on a computing device 104H in some configurations. Like the users 102, the machine learning component 116 can vote on portions of the content 110. In order to enable this functionality, the machine learning component 106 can be trained to vote on portions of content 110 based upon the previous votes of users 102, the type of content 110 being voted on, data relating to the content 110 being voted on, the results of previous votes on particular types of content 110, and/or other types of data.

It is to be appreciated that various machine learning mechanisms may be utilized by the machine learning component 116. For example, a classification mechanism may be utilized to analyze portions of the content 110 to receive an up-vote or a down-vote. In other examples, a statistical mechanism may be utilized to determine whether to up-vote or down-vote a portion of the content 110. For example, a linear regression mechanism may be used to generate a score that indicates a likelihood that a particular portion of the content 110 will be up-voted or down-voted.

Linear regression may refer to a process for modeling the relationship between one variable with one or more other variables. Different linear regression models might be used to calculate the probability that a portion of the content 110 will be up-voted or down-voted. For example, a least squares approach might be utilized, a maximum-likelihood estimation might be utilized, or another approach might be utilized. Such techniques may be utilized to train the machine learning component 116 to vote on portions of the content 110.

Figure 1B:
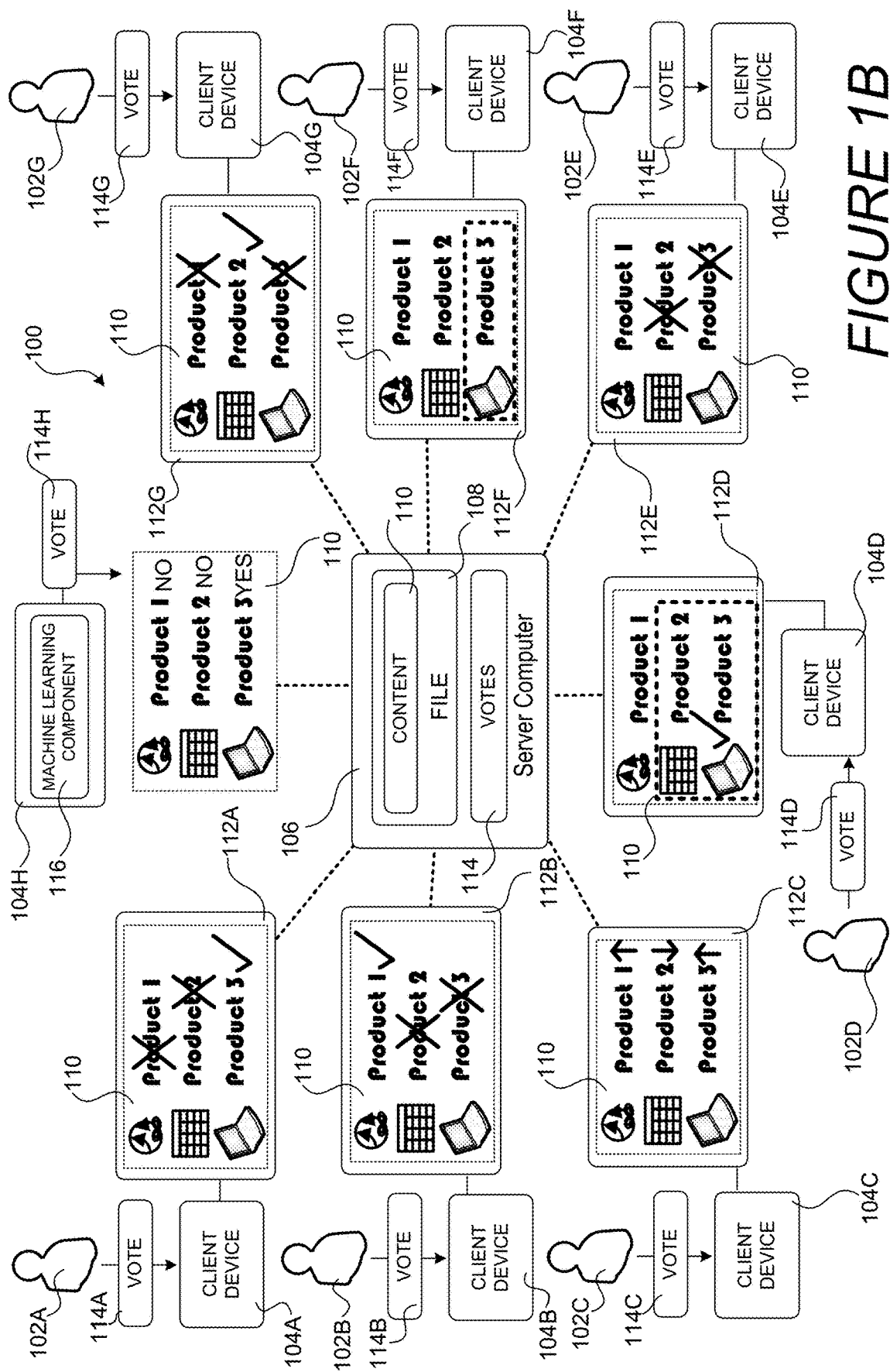
FIG. 1B shows how the computing devices of the system can provide a user interface through which users can vote on portions of content.

FIG. 1B shows how the computing devices 104 of the system shown in FIG. 1A can provide a UI through which the users 102 can vote on portions of content 110. As described briefly above, users 102 participating in a multi-user sharing session can provide input gestures to the client application executing on the client devices 104 in order to cast a vote on portions of the displayed content 110, a digital whiteboard containing three whiteboard objects in this example.

As shown in FIG. 1B, each user 102 can provide an input gesture indicating a preference for a portion of the displayed content 110. For example, and without limitation, a user 102 might provide an input gesture indicating that they favor ("up-vote") or disfavor ("down-vote") a portion of the displayed content 110. Input gestures include, but are not limited to, touch input, pen input (i.e. digital ink), voice input, 2D or 3D gestures, keyboard input, mouse input, touchpad input, and other types of user input that can be made to a computing system to indicate a preference for a portion of displayed content 110.

An input gesture made by a user 102 identifies a portion of the content 110 and indicates the user's preference (i.e. a vote 114) for the portion of the content 110. In the example shown in FIG. 1A, for instance, the user 102A has cast a vote 114A by drawing an "X" over the first and second portions of the content 110 (i.e. product 1 and product 2) indicating a down-vote for those portions of the content 110. The user 102A has also cast a vote 114A for the third portion of the content 110 (i.e. product 3) by drawing a check-mark over third portion of the content 110, thereby indicating an up-vote for that portion of the content 110. Similarly, user 102B has cast a vote 114B by drawing an "X" over the second and third portions of the content 110 (i.e. product 2 and product 3) and drawing a check-mark on the first portion of the content 110 (i.e. product 1). The users 102E and 102G have similarly made "X" and check-mark input gestures to cast their votes 114E and 114G, respectively, on the portions of the content 110.

The user 102C has utilized different gestures to cast their vote 114C on the portions of the content 110. In particular, the user 102C has drawn an up-facing arrow on the first and third portions of the content 110 (i.e. product 1 and product 3) thereby up-voting these portions of the content. The user 102C has also drawn a down-facing arrow on the second portion of the content 110 (i.e. product 2), thereby indicating a down-vote for this portion of the content 110. In this regard, it is to be appreciated that different types of input gestures can be utilized to cast a vote 114 for portions of content 110 and that the input gestures described herein are merely illustrative.

In some configurations, users 102 can select a portion of the content 110 in order to cast a vote 114 for that portion. For instance, in the example shown in FIG. 1B, the user 102F has drawn a rectangle around the third portion of the content 110 (i.e. product 3) in order to cast a vote 114F (i.e. an up-vote) for that portion of the content 110. In a similar fashion, users 102 can select multiple portions of the content 110 in order to cast a single vote for the selected portions. In the example shown in FIG. 1B, for instance, the user 102D has drawn a rectangle around the second and third portions of the content 110 (i.e. product 2 and product 3) and cast a single vote 114D for the selected portions of the content 110. Thus, in some embodiments, the digital ink input gesture identifies a portion of the content, e.g., a drawing object, a section of text, a section of a document, a portion of a video. In addition, the digital ink input gesture can identify a preference for a portion of the content. The preference for the portion of the content can then be used by the system to determine a priority for the portion of the content. As described below, the priority for the portion of the content can be used to modify, delete or provide an annotation in association with the portion of the content.

In some configurations, votes 114 can be cast by groups of users 102. For example, and without limitation, votes 114 can be collected from the users 102 in a group of users 102 and the majority vote 114 will be considered the vote 114 for the group as a whole. The vote cast by the group might also be weighted more heavily than votes cast by individual users 102 or specifically weighted in another manner.

As discussed briefly above, the machine learning component 116 can also cast a vote 114H on the portions of the content 110. In the example shown in FIG. 1B, for instance, the machine learning component 116 has cast down-votes for the first and second portions of the content 110 (i.e. product 1 and product 2) and has cast an up-vote for the third portion of the content 110 (i.e. product 3).

As also described briefly above, the server computer 106, or another computing device operating as a part of the disclosed system 100, can collect the votes 114 from the users 102 in the multi-user sharing session and the machine learning component 116. The server computer 106 can then analyze the votes 114 to determine a priority for each portion of the content 110 that was voted on. In the example shown in FIG. 1B, for instance, the first portion of the content 110 (i.e. product 1) received three down-votes and two up-votes. The second portion of the content 110 (i.e. product 2) received five down-votes and two up-votes. The third portion of the content 110 (i.e. product 3) received three down-votes and five up-votes. In this example, the third portion of the content 110 has the highest priority, the first portion of the content 110 has the second highest priority, and the second portion of the content 110 has the lowest priority.

In some configurations, the server computer 106 applies weights to the votes 114 received from the users 102 in a multi-user sharing session prior to determining the priority for a portion of the content 110. As discussed briefly above, the weighting can be based on a context associated with each of the of users 102 such as, but not limited to, a user's 102 role in an organization, a user's 102 past voting history, and whether a vote was cast by a group of users 102 and, if so, the size of the group. Weights can also be manually assigned to users utilizing an appropriate UI. The weights can be saved for later use with the same user or group of users. Details regarding one illustrative UI for manually specifying weights for the votes 114 made by each user 102 will be provided below with regard to FIGS. 4A AND 4B.

Once the server computer 106, or another computing device, has determined the priorities associated with individual portions of content 110 (e.g. whiteboard objects in the example shown in FIGS. 1A-1C), the server computer 106 can then modify a display of the content 110 based on the computed priorities for the portions of the content 110. Additional details regarding the modification of the content 110 based upon the computed priorities will be described below with regard to FIG. 1C.

Figure 1C:
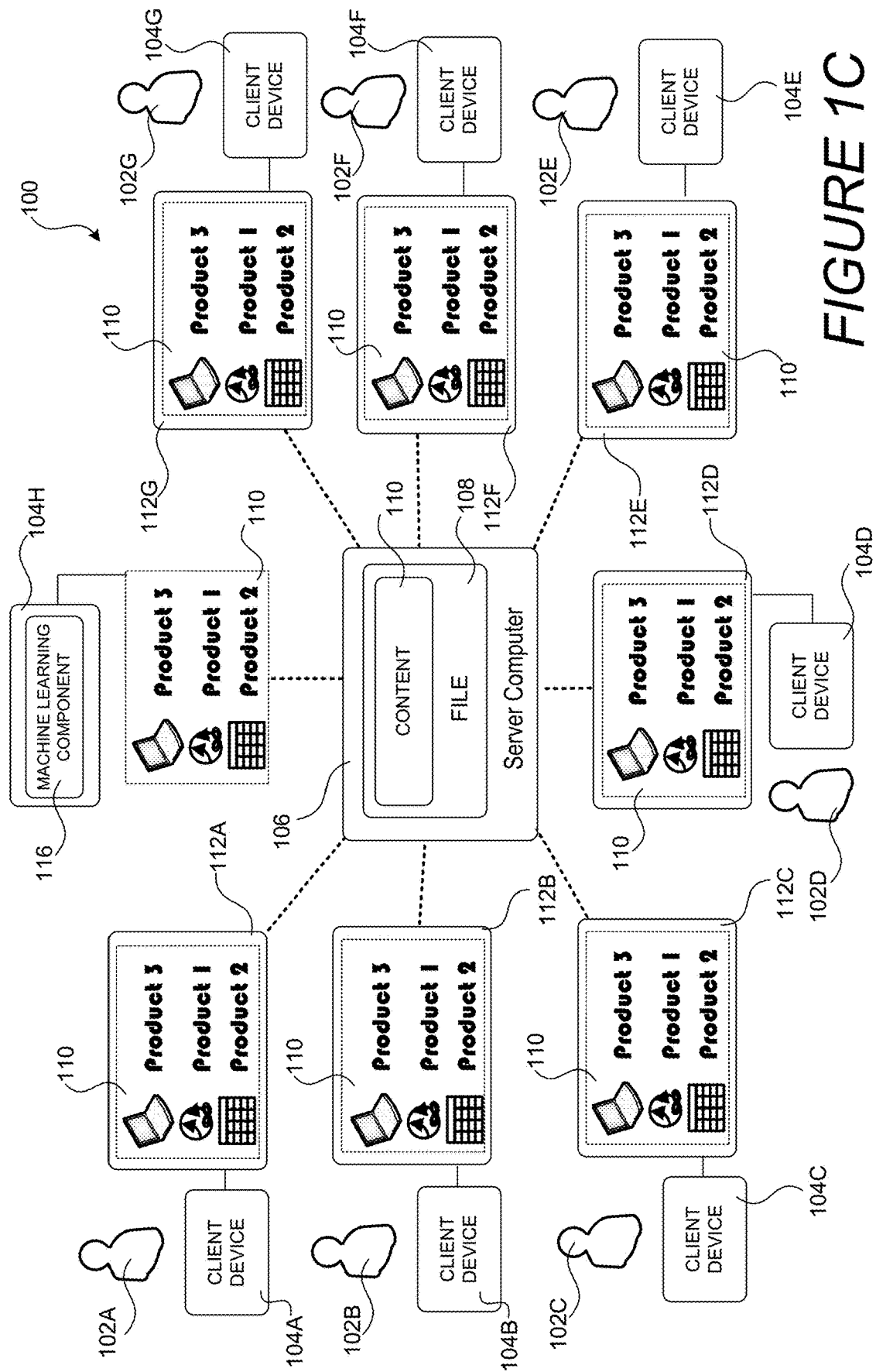
FIG. 1C shows how the computing devices of the system can modify content based upon the votes provided by the users.

FIG. 1C shows how the computing devices of the system 100 can modify a display of the content 110 based on the computed priorities for the voted-on portions of the content 110 by rearranging the portions of the content 110. In this example, for instance, the server computer 106 has rearranged portions of the content 110 (i.e. individual whiteboard objects) based upon the computed priorities. In particular, the third portion of the content 110 (i.e. product 3) has been moved to the top of the display of the content 110, the first portion of the content 110 (i.e. product 1) has been moved to the middle of the display of the content 110, and the second portion of the content 110 (i.e. product 2) has been moved to the bottom of the display of the content 110.

It is to be appreciated that the server computer 106 can modify the display of the content 110, or the content 110 itself, in various ways based upon the computed priorities. For example, and without limitation, the server computer 102 can delete a portion of the content 110 if the portion of the content 110 has a priority lower than a threshold value, generate an annotation indicating the preference for the portion of the content 110, identify high-priority portions of content 110 or low-priority portions of content 110, or add a UI element to the content 110 to bring focus to a portion of the content 110 if the portion of the content 110 has a priority exceeding a threshold value.

The server computer 106, or another device or component, can modify the content 110 in other ways based upon the priority associated with portions of the content 110 in other configurations. Some additional ways that the server computer 106 can modify the content 110 are described below with reference to FIGS. 2A-2D.

In some configurations, the server computer 106 can also generate a report (not shown in FIG. 1C) that indicates the user preferences for portions of the content 110 and that provides other information regarding the voting. For example, and without limitation, such a report can identify the users 102 that participated in a vote, the votes 114 cast by each user 102, the computed priorities for each portion of content 110, and the modifications made to the content 110 based on the voting. Such a report could also describe the historical participation of users 102 in voting, the historical votes 114 cast by the users 102 (e.g. a histogram showing the history of votes 114 cast or not cast by each user), the historical results of votes, and/or other types of information.

FIGS. 2A-2D illustrate how votes 114 made by users 102 can cause the system 100 to modify other aspects of content 110. The example shown in FIGS. 2A-2D also illustrates how the disclosed system 100 can highlight content, delete content, or provide an annotation with respect to specific portions of content 110 based upon the votes 114.

In the example illustrated in FIGS. 2A-2D, the content 110 is an architectural drawing of the layout of a house. As in the example described above with regard to FIGS. 1A-1C, the system 100 enable the users 102 to participate in a multi-user sharing session, in this case a digital whiteboard presenting the architectural drawing. As also in the example above, the users 102 can access the multi-user sharing session utilizing the client computing devices 104.

Figure 2A:
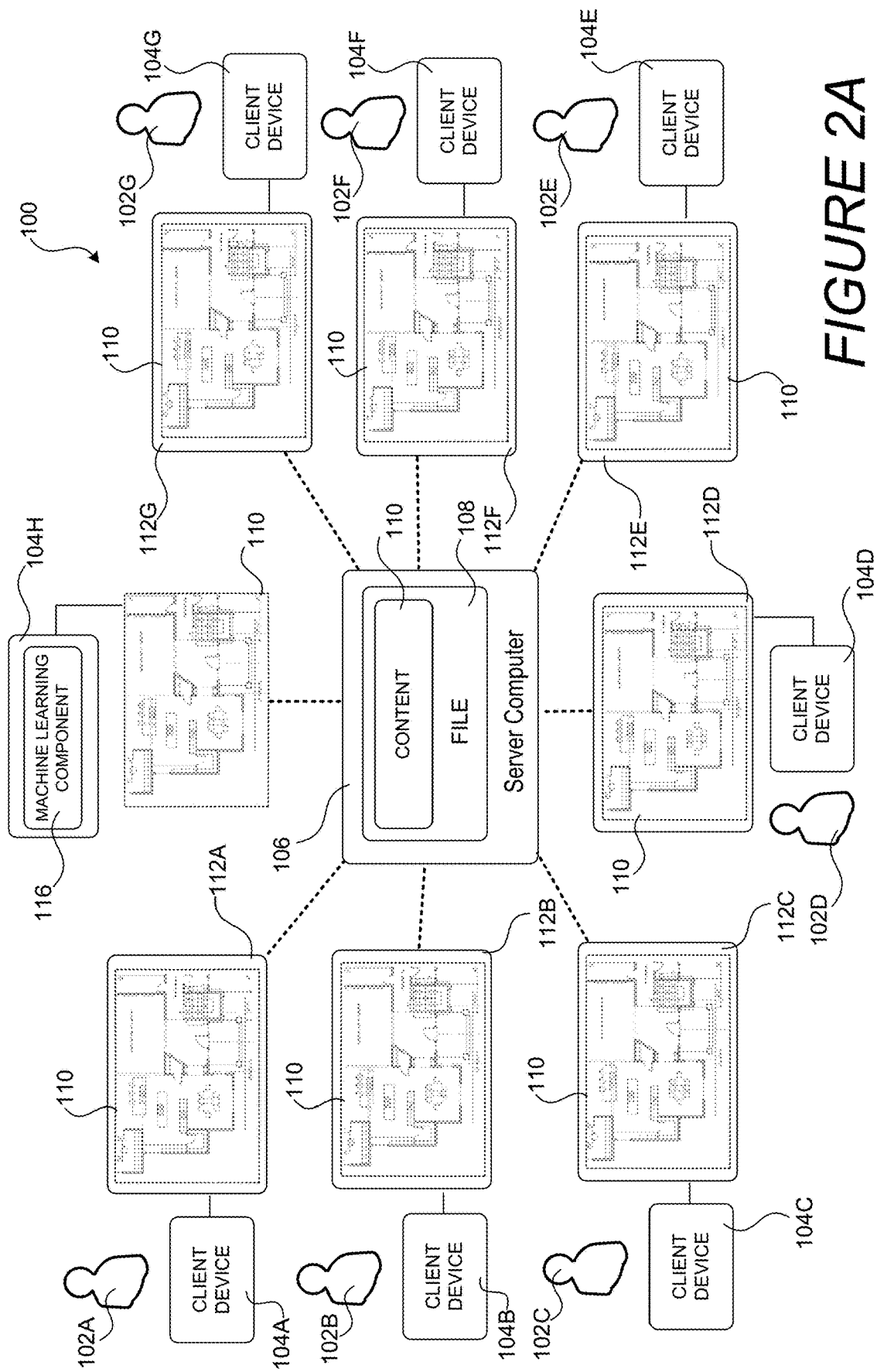
FIG. 2A illustrates how the system can be utilized to modify other types of content based upon votes provided by users.
Figure 2B:
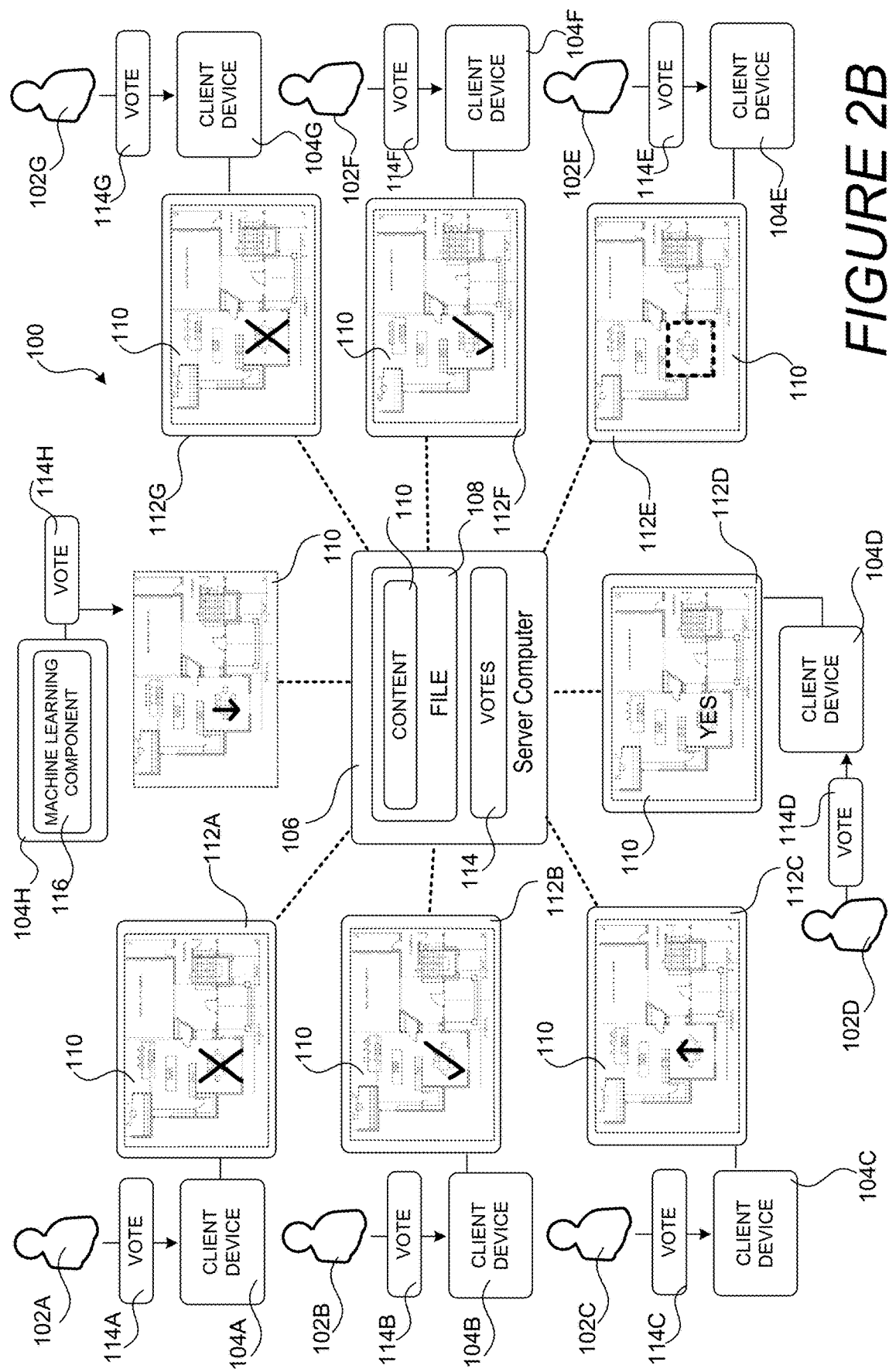
FIG. 2B shows how the computing devices of the system can provide a user interface through which users can vote on portions of content.

FIG. 2B shows the users 102 casting votes 114 with respect to portions of the content 110. In particular, the users 102A and 102G have utilized various input gestures to cast votes 114A and 114G, respectively, down-voting a portion of the architectural diagram showing the location of a dining room. The machine learning component 116 has also cast a vote 114H down-voting the location of the dining room. The users 102B-102F have utilized various input gestures to cast votes 114B-114G, respectively, up-voting the portion of the architectural diagram showing the location of the dining room.

As in the example described above, the server computer 106, or another computing device operating as a part of the disclosed system 100, can collect the votes 114 from the users 102 in the multi-user sharing session and the machine learning component 116. The server computer 106 can then tally the votes 114 and analyze the votes 114 to determine a priority for each portion of the content 110 that was voted on. In the example shown in FIG. 2B, for instance, the portion of the architectural diagram showing the location of the dining room has received four up-votes and two down-votes.

Figure 2C:
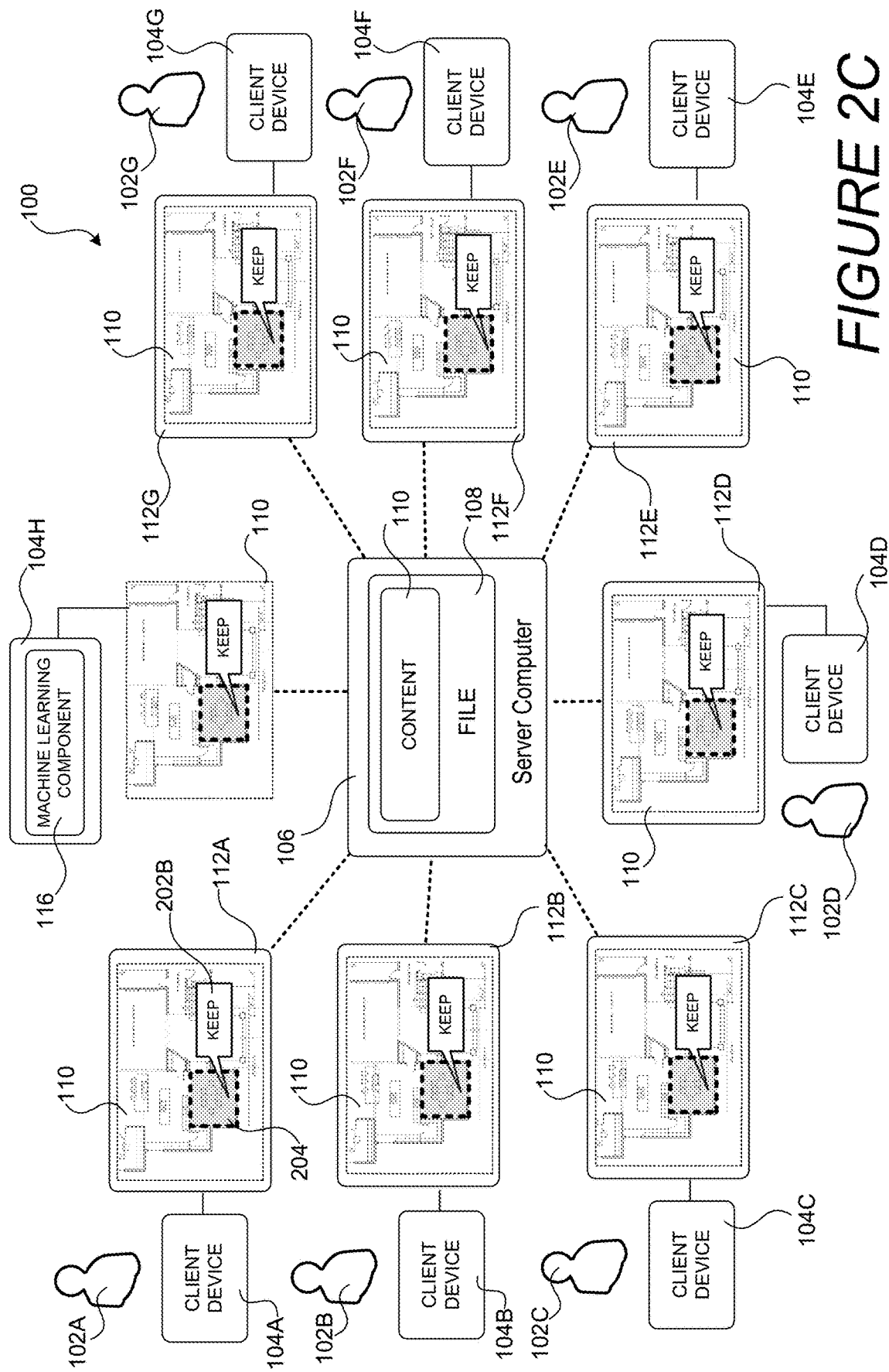
FIG. 2C shows other examples of how the computing devices of the system can modify content based upon the votes provided by the users.
Figure 2D:
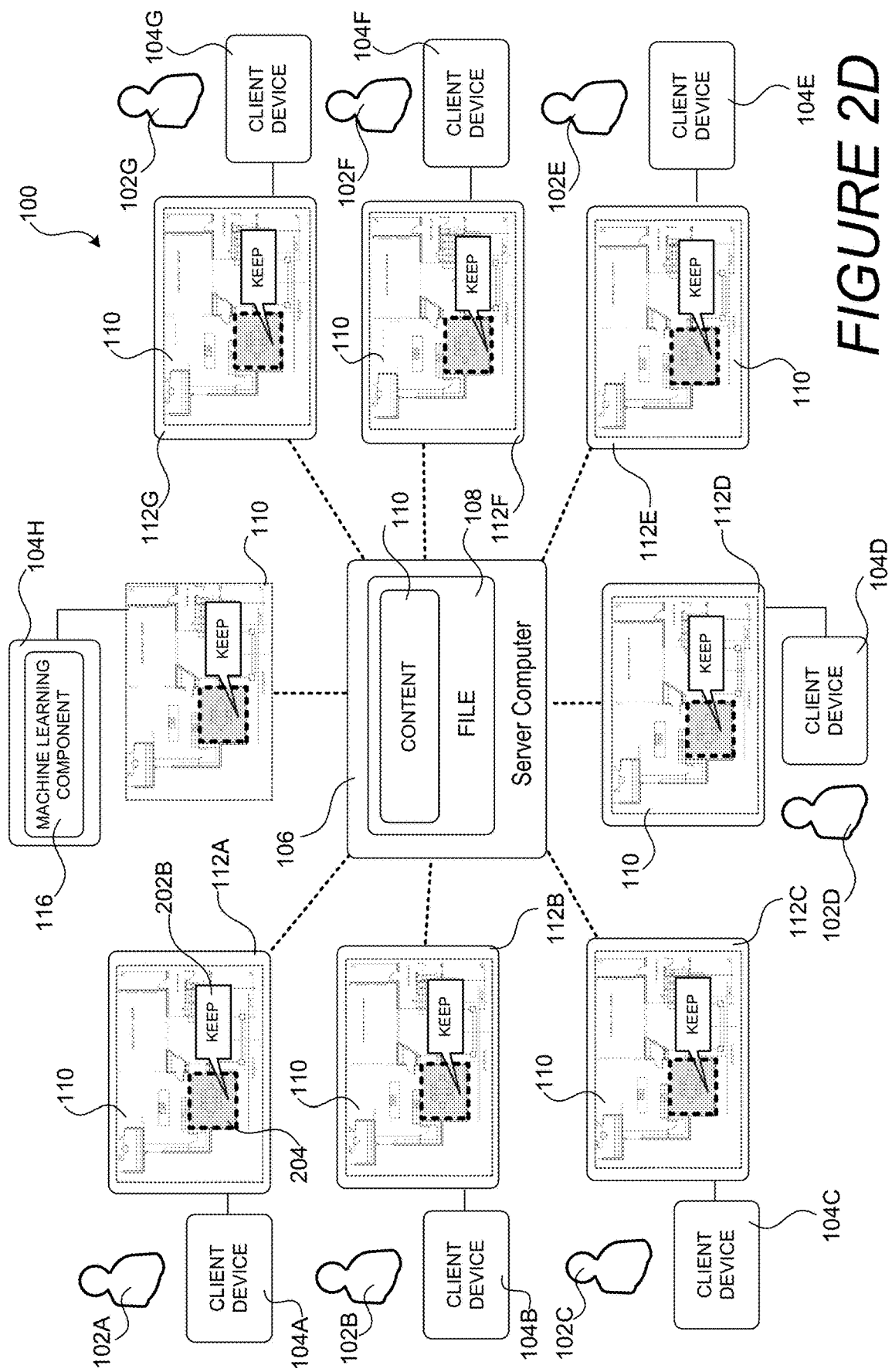
FIG. 2D shows other examples of how the computing devices of the system can modify content based upon the votes provided by the users.

FIG. 2C shows other examples of how the computing devices of the system 100 can modify content 110 based upon the votes 114 provided by the users 102. In the illustrated example, the system 100 has added UI elements to the display of the content 110 to bring focus to preferred features (e.g. the illustrated location of the dining room) in the content 110. In particular, an annotation 202B indicating the users' 102 preference for the portion of the content 110 has been added (i.e. the 'keep' annotation). Annotations might also include other information such as, but not limited to, data indicating the number of users that up-voted or down-voted a particular section of content. Another UI element 204 has also been added to the display of the content 110 to highlight the up-voted portion of the content 110. In some configurations, such UI elements are added to the display of the content 110 if the portion of the content has a priority exceeding a threshold value.

An annotation 202A (i.e. the 'remove' annotation) has also been added indicating the down-voting of another portion of the content 110 (i.e. an alternate location for the dining room in the architectural plan). In some configurations, a down-voted portion of the content 110 can be deleted if the priority of the content 110 does not exceed a predetermined threshold value. This is illustrated in FIG. 2C.

The deletion or other type of modification of a portion of the content 110 can be indicated by modifying other properties of the content in other configurations. For example, the removed or modified portion can be indicated with digital ink (e.g. drawing a circle or other type of shape around a deleted or modified portion of the content using digital ink), might be highlighted, colored, or otherwise emphasized, or might be displayed with reduced brightness or translucently. Modified content might also be identified in a list. A UI control, such as a slider control, might also be utilized to transition between a view of the original content and the modified content.

An audio output can also be used to bring focus to a portion of the content. For example, a voice instruction can be generated to describe a portion of content and one or more results related to the determined priority or the votes. In other embodiments, a voice output may indicate an annotation that was proposed and added to the content.

FIGS. 3A-3F show a multi-user sharing session in a 3D collaborative workspace through which users 102 can vote on content 110 that includes virtual and real objects displayed in a mixed reality computing environment. In the configuration shown in FIGS. 3A-3F, a head-mounted display ("HMD") device 302A, alone or in combination with one or more other devices (e.g. a local computer or one or more remotely-located server computers) provides a multi-user sharing session that includes a 3D collaborative workspace.

It will be understood that the HMD device 302A might take a variety of different forms other than the specific configuration depicted in FIGS. 3A-3F. Moreover, although the configurations disclosed herein are discussed primarily in the context of augmented reality ("AR") HMD devices, it is to be appreciated that the technologies disclosed herein can also be utilized with mixed reality ("MR") and virtual reality ("VR") HMD devices.

The HMD device 302A includes one or more display panels (not shown in FIGS. 3A-3F) that display computer generated ("CG") graphics. For example, the HMD device 302A might include a right-eye display panel for right-eye viewing and a left-eye display panel for left-eye viewing. A right-eye display panel is typically located near a right eye of the user 102A to fully or partially cover a field of view of the right eye, and a left-eye display panel is located near a left eye of the user 102A to fully or partially cover a field of view of the left eye.

In another example, a unitary display panel might extend over both the right and left eyes of a user 102A and provide both right-eye and left-eye viewing via right-eye and left-eye viewing regions of the unitary display panel. In each of these implementations, the ability of the HMD device 302A to separately display different right-eye and left-eye graphical content via right-eye and left-eye displays might be used to provide a user 102A of the HMD device 302A with a stereoscopic viewing experience. For ease of illustration, the stereoscopic output of the HMD device 302A is illustrated in FIGS. 3A-3F as being presented on a two-dimensional display device 112A.

The HMD device 302A might include a variety of on-board sensors forming a sensor subsystem (not shown in FIGS. 3A-3F). For example, and without limitation, the sensor subsystem might include outward facing optical cameras (e.g., cameras located on an external surface of the HMD device 302A and forward facing in a viewing direction of the user 102A). The outward facing optical cameras 102 of the HMD device 302A can be configured to observe the real-world environment and output digital images illustrating the real-world environment observed by the one or more outward facing optical cameras 102. The HMD device 302A can also include inward facing optical cameras (e.g., rearward facing toward the user 102A and/or toward one or both eyes of the user 102A).

The sensor subsystem can also include a variety of other sensors including, but not limited to, accelerometers, gyroscopes, magnetometers, environment understanding cameras, depth cameras, inward or outward facing video cameras, microphones, ambient light sensors, and potentially other types of sensors. Data obtained by the sensors of the sensor subsystem can be utilized to detect the location, orientation, and movement of the HMD device 302A. The location, orientation, and movement of the HMD device 302A can be utilized to compute the view of the virtual reality objects presented to the user 102A by the HMD device 302A.

The HMD device 302A might also include a processing subsystem (not shown in FIGS. 3A-3F) that includes one or more processor devices that perform some or all of the processes or operations described herein, as defined by instructions executed by the processing subsystem. Such processes or operations might include generating and providing image signals to the display panels, receiving sensory signals from sensors in the sensor subsystem, enacting control strategies and procedures responsive to those sensory signals, and enabling the voting and modification of virtual reality objects in the manner described herein. Other computing systems, such as local or remote computing systems might also perform some or all of the computational tasks disclosed herein.

The HMD device 302A might also include an on-board data storage subsystem (not shown in FIGS. 3A-3F) that includes one or more memory devices storing computer-executable instructions (e.g., software and/or firmware) executable by the processing subsystem and might additionally hold other suitable types of data. The HMD device 302A might also include a communications subsystem (also not shown in FIGS. 3A-3F) supporting wired and/or wireless communications with remote devices (i.e., off-board devices) over a communications network. As an example, the communication subsystem might be configured to wirelessly send or receive a video stream, audio stream, coordinate information, virtual object descriptions, and/or other information to and from other remote computing devices, such as the HMD displays 302B and 302C.

In the example shown in FIGS. 3A-3F, the HMD device 302A generates a view of the real world environment 300 surrounding the user 302A. The HMD device 302A can also overlay virtual objects on the user's view of the real world environment 300. For instance, in the illustrated example the HMD device 302A has generated a virtual table and a virtual window and presented these virtual objects overlaid on the view of the real world environment 300. The virtual objects, therefore, appear to the user 302A as if they were actually present in the real world environment 300.

The HMD device 302A can also transmit its display, including the virtual objects and the real world environment 300, to other remote computing devices. In the example shown in FIGS. 3A-3F, for instance, the output of the HMD 302A has been transmitted to the HMD device 302B and the HMD device 302C. In this manner, the users 102B and 102C can see the view of the real world environment 300 as viewed by the user 102A along with any virtual objects overlaid thereupon. In this regard, it is to be appreciated that the configurations disclosed herein do not require the users 102B and 102C to utilize HMD devices. The users 102B and 102C can utilize other types of devices, such as laptop computers, smart phones, or desktop computers, to view the output of the HMD device 102A and to vote on content 110 presented therein.

In the example shown in FIGS. 3A-3F, the users 102A-102C have cast votes 114A-114C, respectively, on the virtual objects (i.e. the window and the table) shown in the output of the HMD device 302A. For instance, HMDs 302A-302C can recognize hand gestures made by the users 102A-102C, respectively, indicating a preference related to real-world objects and virtual objects. The HMDs 302A-302C can also be configured to recognize voice commands made by the users 102A-102C, respectively, indicating a preference related to real-world objects and virtual objects.

In the example shown in FIGS. 3A-3F, the user 102A has cast a vote 114A up-voting the table and down-voting the window. The user 102B has cast a vote 114B up-voting the window and down-voting the table. The user 102C has cast a vote 114C up-voting the table and down-voting the window. The system can analyze the votes 114A-114C to rank and/or prioritize the virtual objects in the manner described above.

Figure 3A:
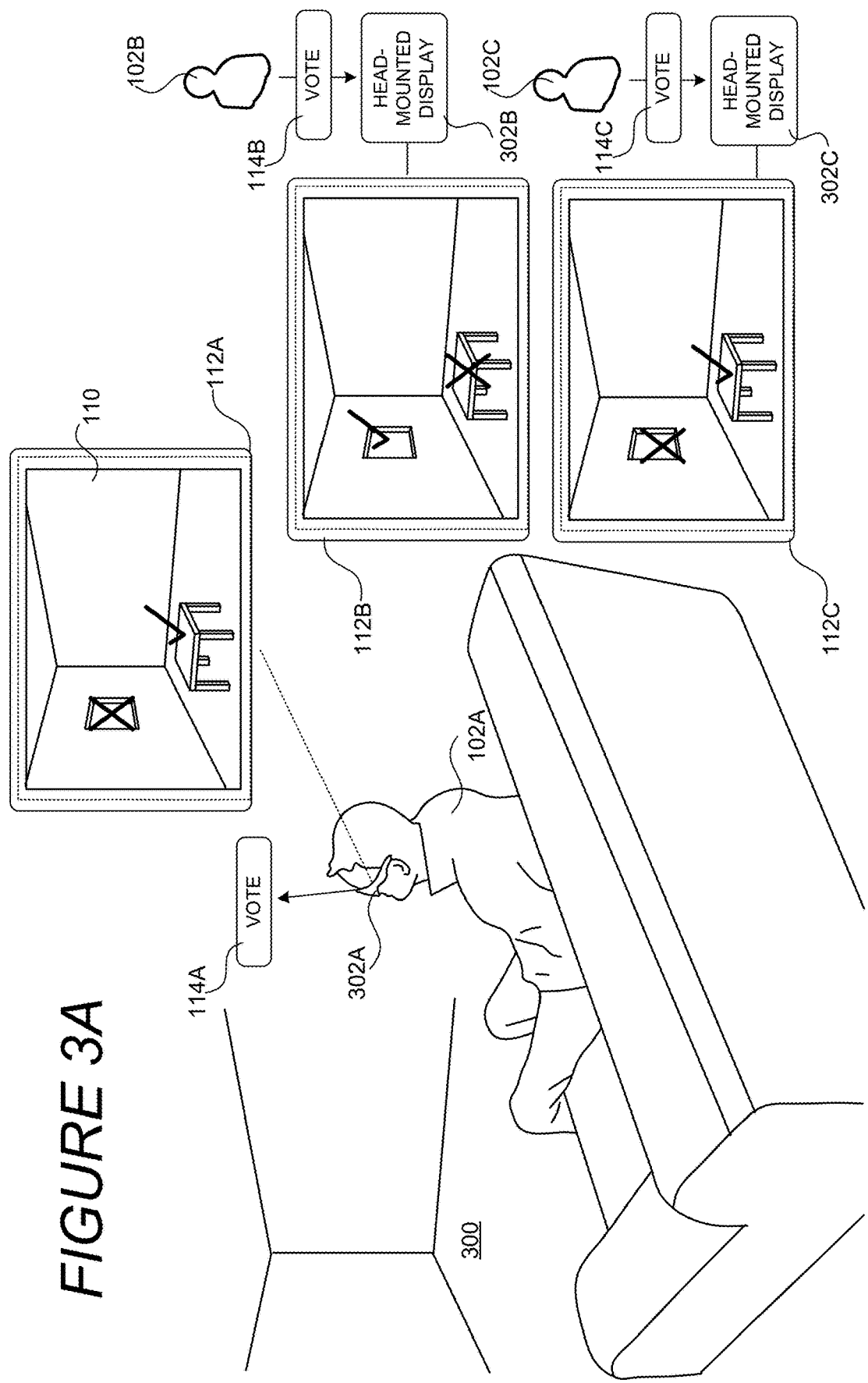
FIG. 3A shows a multi-user sharing session in a three-dimensional (3D) collaborative workspace through which users can vote on content that includes virtual and real objects displayed in a mixed reality computing environment.
Figure 3B:
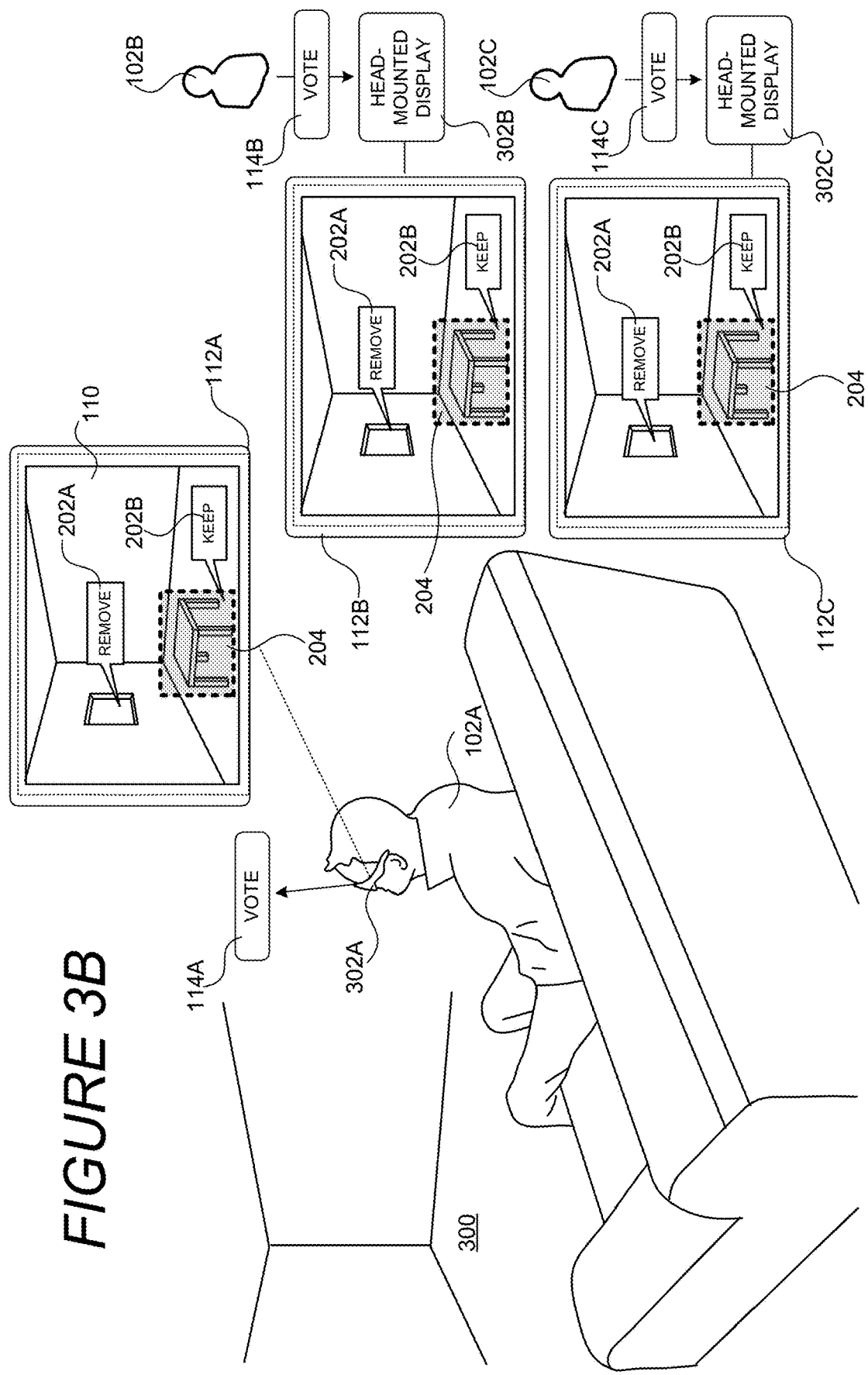
FIG. 3B shows how virtual content can be modified based upon votes provided by the users of a 3D collaborative workspace.
Figure 3C:
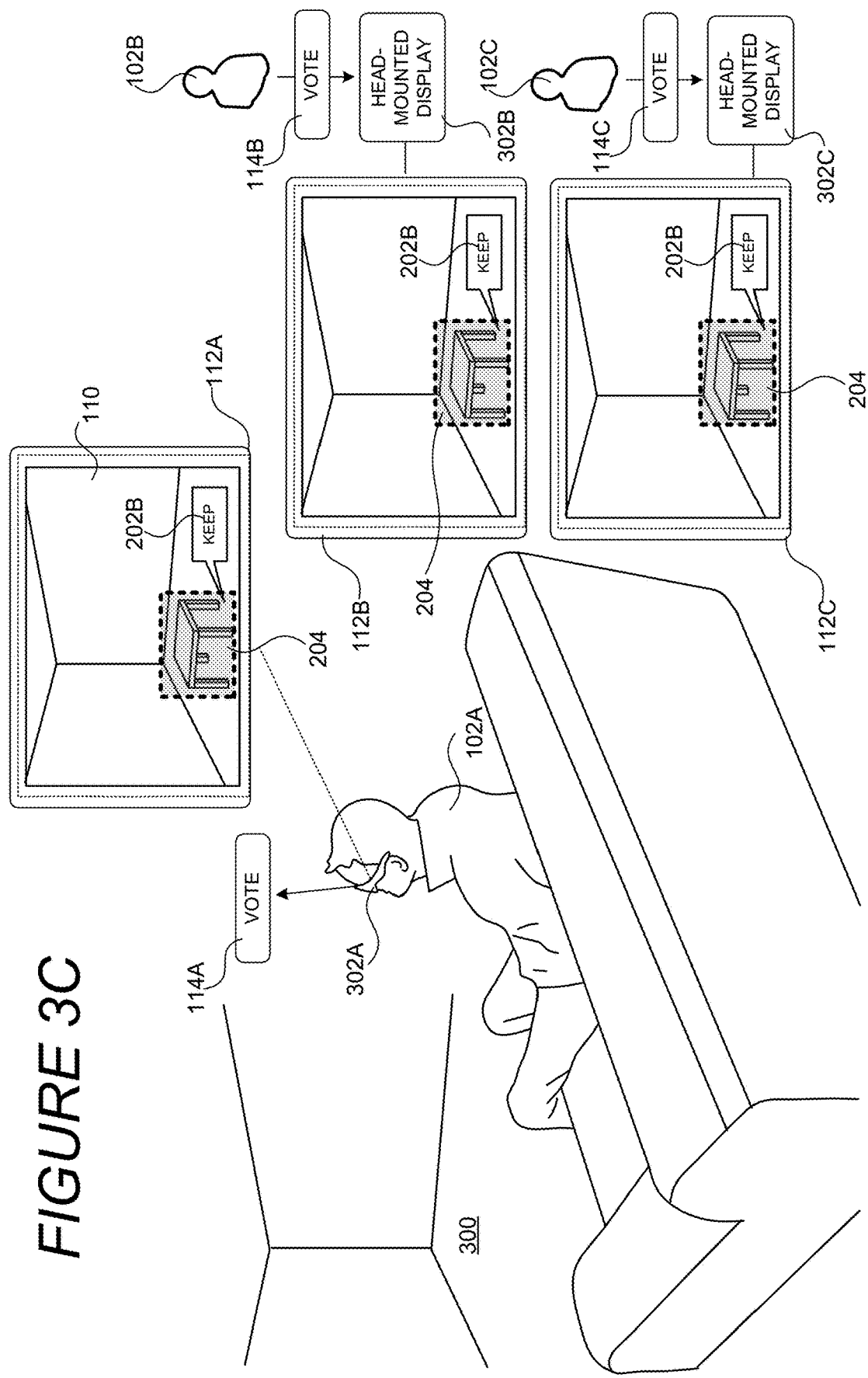
FIG. 3C shows how virtual content can be modified based upon votes provided by the users of a 3D collaborative workspace.

FIG. 3B shows how virtual content 110 can be modified based upon votes 114 provided by the users 102 of a 3D collaborative workspace. In the example shown in FIG. 3B, UI elements have been added to the view of the real-world environment 300 and the virtual objects to bring focus to the virtual objects based upon the results of the voting. In particular, an annotation 202A has been associated with the window indicating that the window has been down-voted and that it should be removed from the scene. The system 100 might also dim or change display properties of virtual objects that are not determined to be a high priority. For instance, in this example, the window can be faded or distorted if the results of the voting indicates that it is a lower priority than other virtual objects. The window or other content might also be removed from the view altogether as shown in FIG. 3C.

An annotation 202B has also been associated with the table indicating that the table has been up-voted and that it should be retained in the scene. The system 100 has also added a UI element 204 to the display of the content 110 to highlight the up-voted virtual object (i.e. the table). As discussed above, such a UI element can be added to the display of the content 110 if the portion of the content 110 has a priority exceeding a threshold value.

Figure 3E:
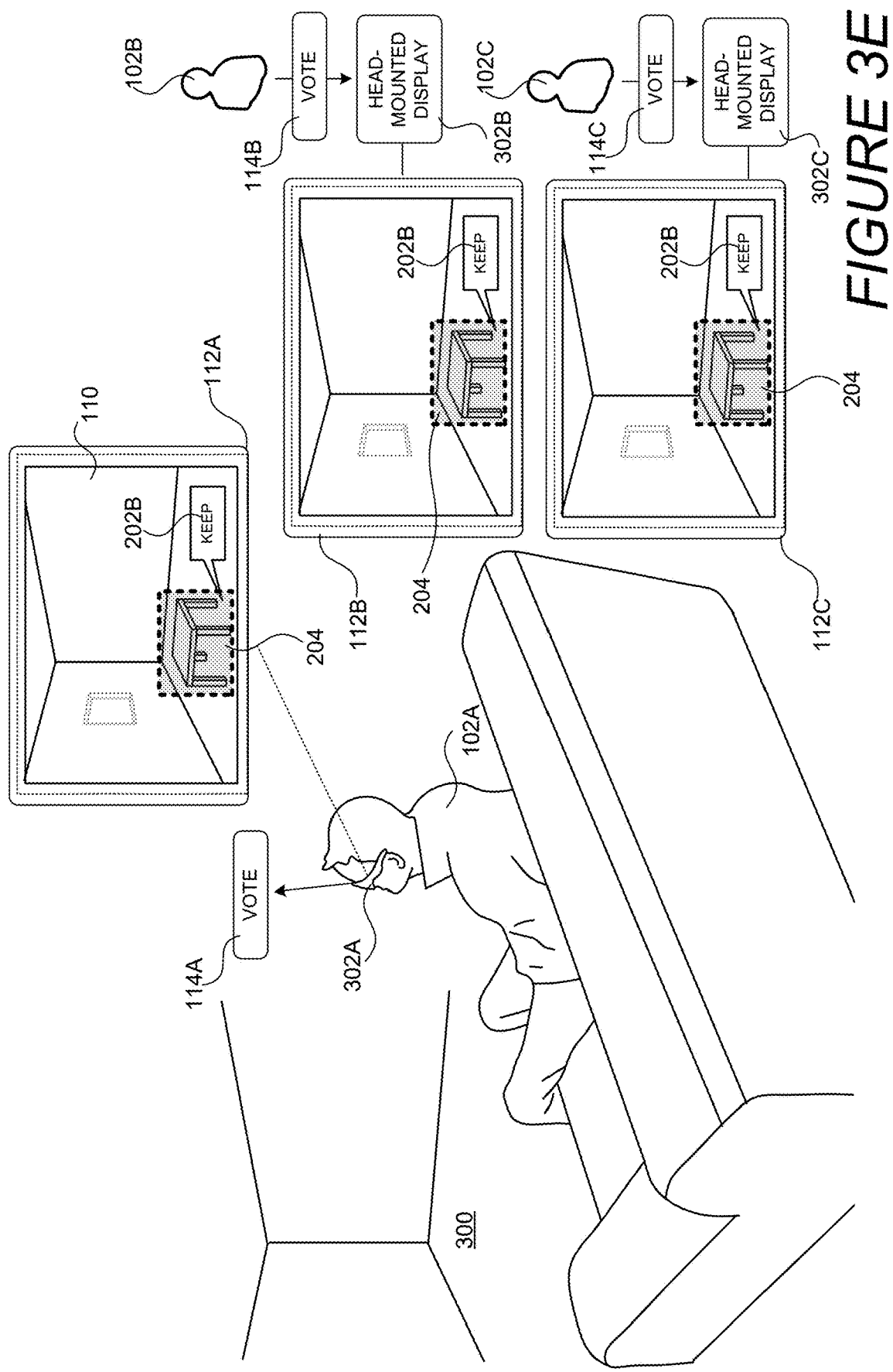
FIG. 3E shows how virtual content can be modified based upon votes provided by the users of a 3D collaborative workspace.
Figure 3F:
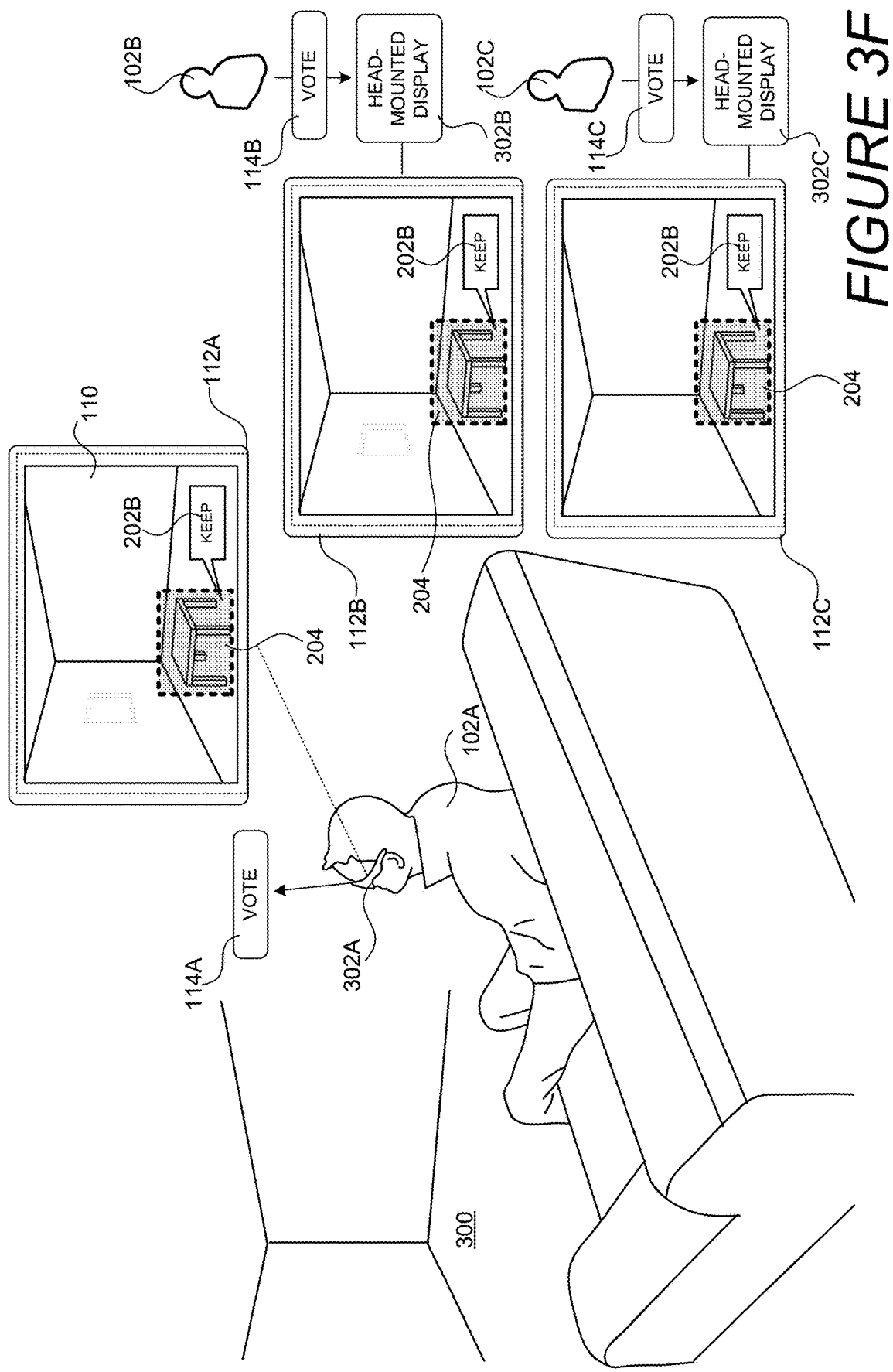
FIG. 3F shows how virtual content can be modified based upon votes provided by the users of a 3D collaborative workspace.

FIGS. 3D-3F illustrate one example where a display attribute of down-voted content can be gradually modified as voting progresses. In this example, the intensity of a down-voted virtual object (e.g. the illustrated window) is gradually decreased as voting progresses. In FIG. 3D, for instance, a few users 102 might have down-voted the window and, as a result, its intensity has been reduced. Later, a few more users 102 might have down-voted the window and, as a result, its intensity has been reduced further as shown in FIG. 3E. Finally, once all of the users 102 have completed voting and the votes have been tallied, the window might be removed altogether. It is to be appreciated that visual attributes other than intensity can be modified as voting progresses including, but not limited to, translucency, color, and shading.

Figure 4A:
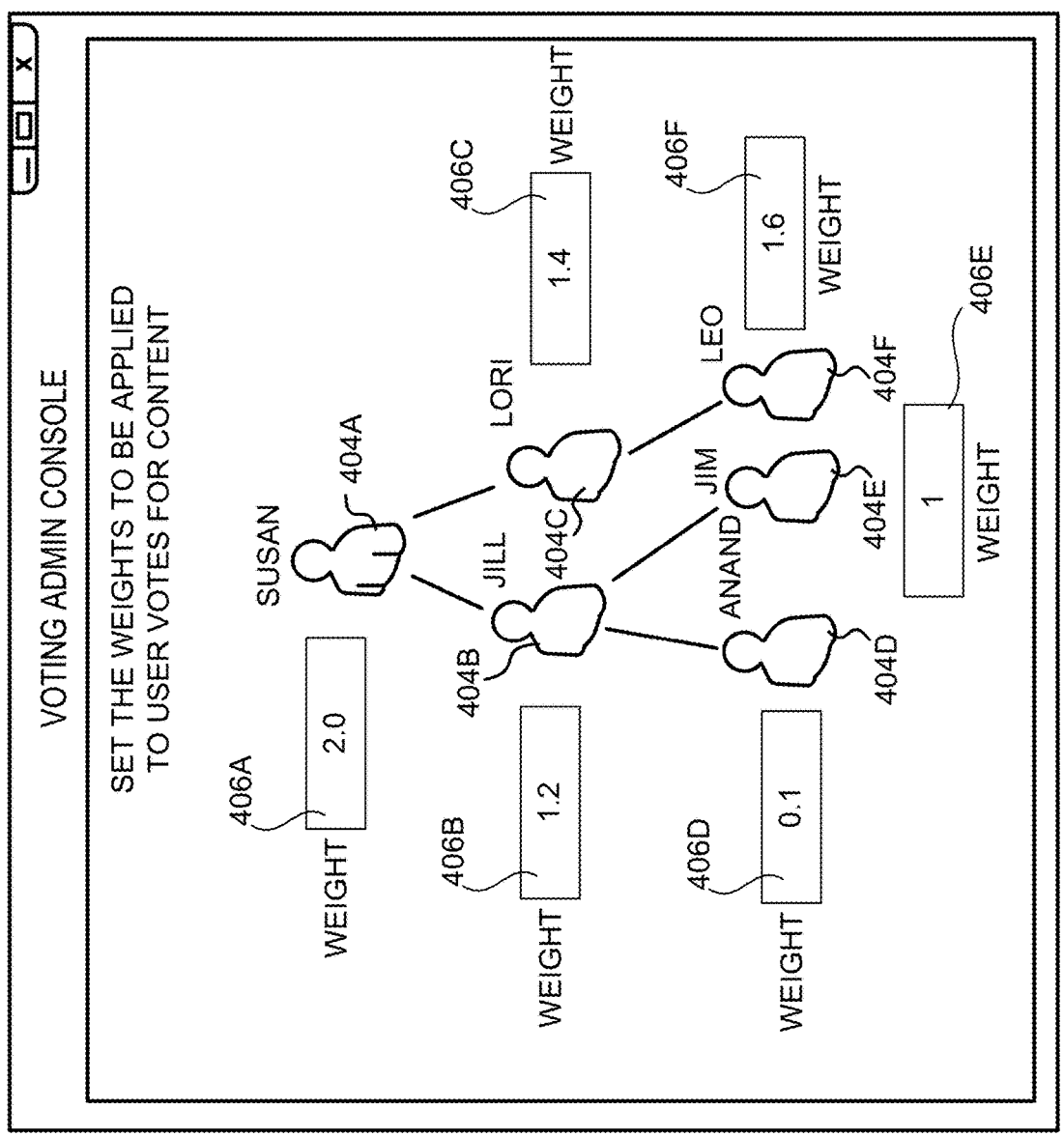
FIG. 4A shows a user interface for associating weights with votes provided by different users.
Figure 4B:
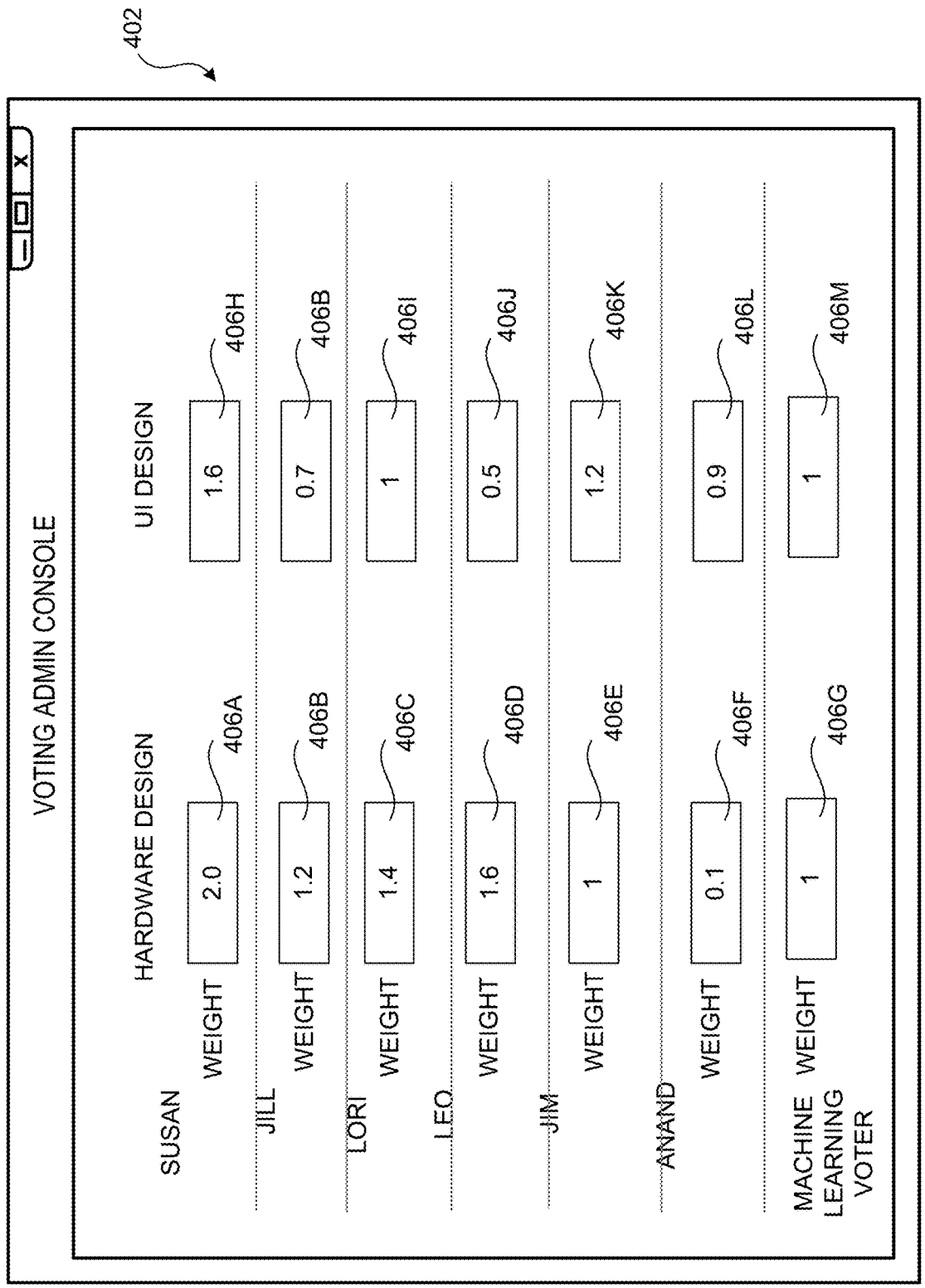
FIG. 4B shows a user interface for associating weights with votes provided by different users.

Turning now to FIGS. 4A AND 4B, an illustrative user interface for associating weights with votes 114 provided by different users 102 will be described. As discussed briefly above, the server computer 106 applies weights to the votes 114 received from the users 102 in a multi-user sharing session prior to determining the priority for a portion of the content 110 in some configurations. As also discussed briefly above, the weighting can be manually specified or based on a context associated with each of the of users 102 such as, but not limited to, a user's 102 role in an organization or a user's 102 past voting history. FIG. 4A shows a UI 402 that can be utilized to manually specify the weights for votes made by users 102 of the system 100 described herein.

As illustrated in FIG. 4A, the UI 402 displays a tree structure defining a hierarchy of users 102 within an organization. Icons 404A-404F are provided for each of the users 102 and lines connecting the icons 402A-404F indicate the relative relationships between the users 102 within the organization.

The UI 402 also includes UI fields 406A-406F that correspond to the icons 404A-404F and their associated users 102. A user of the UI 402 can specify weights to be applied to votes 114 made by each of the users 102 in the fields 406A-406F. For example, a weight of 2.0 is to be applied to votes 114 made by a user 102 named "Susan," a weight of 1.0 is to be applied to votes 114 made by a user 102 named "Jim," and a weight of 0.1 is to be applied to votes 114 made by a user 102 named "Anand."

In some configurations, the weights shown in the UI fields 406A-406F can be prepopulated by analyzing whether users 102 were in the majority during previous votes or by analyzing other information. For example, a user 102 that is regularly in the majority when voting might have an assigned weight that is higher than the weight for a user that is rarely in the majority or that does not regularly vote.

As discussed above, the weights can also vary based on the content 110 or a context associated with each user 102. For instance, votes 114 made by users 102 associated with a team or certain roles of an organization can be weighted differently than others. Weights might also be modified based upon a user's participation in votes, such as by lowering the weight for a user 102 that does not vote often. A non-vote by a user might also be considered in various ways, such as counting a non-vote as a negative vote or negatively impacting the weight associated with a user 102.

As shown in FIG. 4B, the UI 402 might also be configured as a list showing the users 102 and their corresponding weights. In this example, a machine learning component 116 has also been assigned weights. Additionally, in this example, different weights can be assigned to users based on certain contexts. For instance, different weights might be assigned to the users 102 depending upon the topic that is being voted on, in this case hardware design or UI design. Different weights might be assigned to users 102 for different contexts such as, but not limited to, the identities of the other people in a particular voting session, the location of a meeting, or whether votes are cast as a team or committee. The assigned weights might or might not be viewable to the voting participants.

Figure 5:
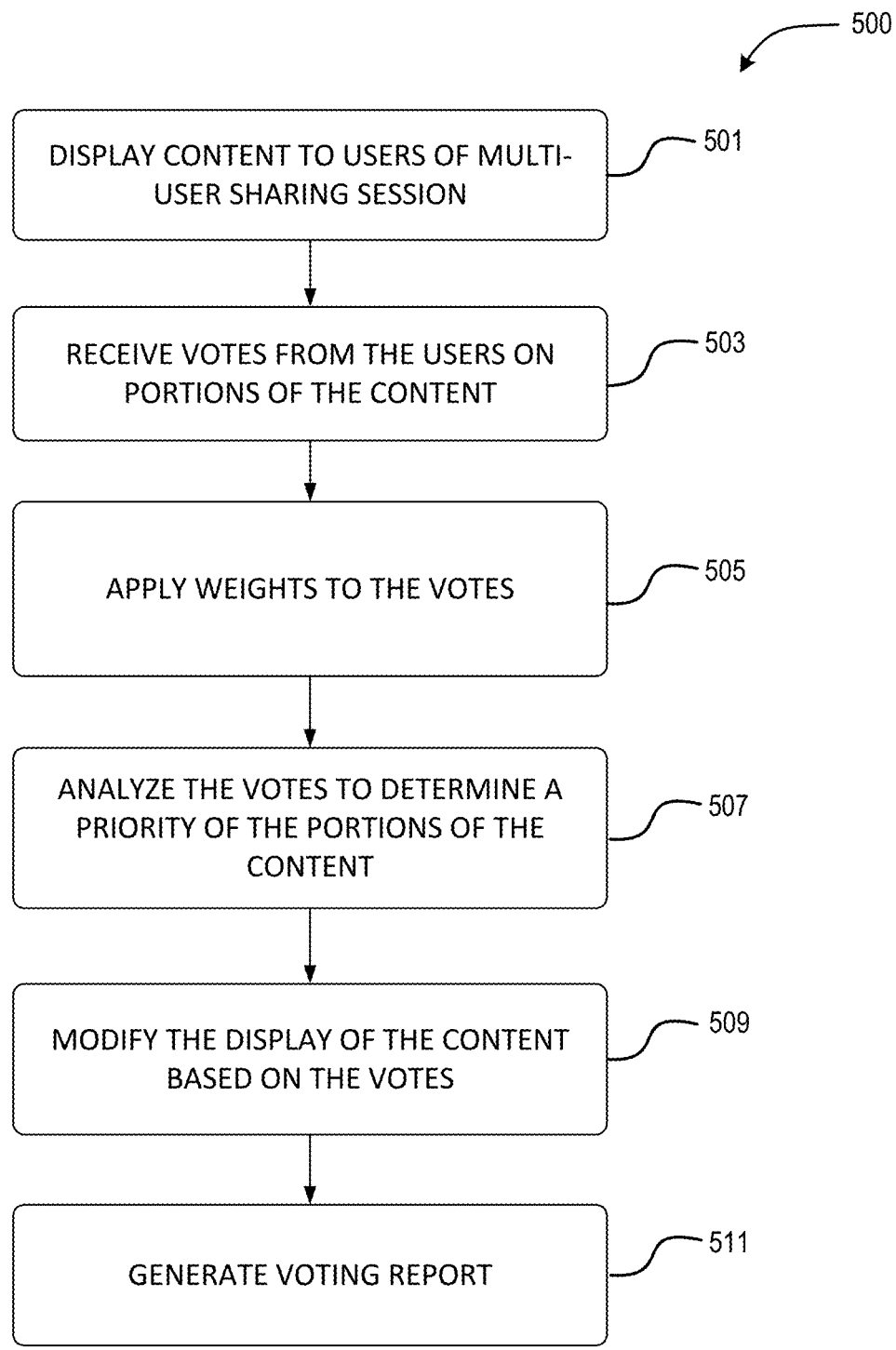
FIG. 5 is a flow diagram showing aspects of a routine for providing a computationally efficient human-computer interface for collaborative modification of content.

FIG. 5 is a flow diagram illustrating aspects of a routine 500 for enabling aspects of the present disclosure. It should be appreciated that the logical operations described herein with regard to FIG. 5, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

For example, the operations of the routine 500 can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustration refers to the components of the FIGS., it can be appreciated that the operations of the routine 500 may be also implemented in many other ways. For example, the routine 500 may be implemented, at least in part, by a processor of another remote computer, processor or circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, the routine 500 begins at operation 501 where content 110 is presented to the users 102 of a multi-user sharing session. As discussed above, the multi-user sharing session might, for example, be implemented as a digital whiteboard presenting whiteboard objects or as a 3D collaborative workspace presenting virtual objects displayed in a mixed reality computing environment in another configurations.

From operation 501, the routine 500 proceeds to operation 503, where votes 114 are received from the users 102 of the multi-user sharing session. As discussed above, users 102 participating in a multi-user sharing session can provide input gestures in order to vote on portions of the displayed content. The input gestures made by the users indicate a preference for a portion of the displayed content. For example, and without limitation, a user might provide an input gesture indicating that they favor or disfavor a portion of the displayed content 110.

From operation 503, the routine 500 proceeds to operation 505, where a server computer, or other computing device operating as a part of the disclosed system 100, collects the votes 114 from the users 102 in the multi-user sharing session. The server computer can also apply weights to the votes 114 received from the users 102 in a multi-user sharing session prior to determining the priority for a portion of the content 110. As discussed above, the weights can be user-specified or can be based on a context associated with each of the of users 102 such as, but not limited to, a user's role in an organization or a user's past voting history.

From operation 505, the routine 500 proceeds to operation 506, where the server computer analyzes the votes 114 to determine a priority for a portion of the content 110. The routine 500 then proceeds to operation 509, where the server computer can then modify a display of the content 110 based on the priority for the portion of the content 110 by rearranging the content, deleting the portion of the content if the portion of the content has a priority not exceeding a threshold, generating an annotation indicating the preference for the portion of the content, or adding a UI element to the content to bring focus to the portion of the content if the portion of the content has a priority exceeding a threshold. The server computer can modify the content in other ways based upon the priority associated with the portions of the content in other configurations.

From operation 509, the routine 500 proceeds to operation 511, where the server computer can also generate a report that indicates the user preferences for portions of the content 110 and that provides other information regarding the voting. As discussed above, the report can include data identifying the users 102 that participated in a vote, the votes 114 cast by each user 102, the computed priorities for each portion of content 110, and the modifications made to the content 110 based on the voting. Such a report could also describe the historical participation of users 102 in voting, the historical votes 114 cast by the users 102 (e.g. a histogram showing the history of votes 114 cast by each user, including non-votes), the historical results of votes, and/or other types of information in other configurations.

FIG. 6 shows additional details of an example computer architecture 600 for a computer, such as the client devices and the server computer 106 shown in FIGS. 1A-2C, capable of executing the program components described herein. Thus, the computer architecture 600 illustrated in FIG. 6 illustrates an architecture for a server computer, a mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 606, an application 620 such as a digital whiteboard application, the machine learning component 116, a file 108 containing content 110, and other data described herein.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer-readable storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer-readable storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computer architecture 600. For purposes of the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown in FIG. 6). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (also not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

According to various implementations, the distributed computing environment 700 includes a computing environment 702 operating on, in communication with, or as part of the network 704. The network 704 may be or may include the network 656, described above with reference to FIG. 6. The network 704 also can include various access networks. One or more client devices 706A-706N (hereinafter referred to collectively and/or generically as "clients 706" and also referred to herein as computing devices 706) can communicate with the computing environment 702 via the network 704 and/or other connections (not illustrated in FIG. 7).

In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein. It should be understood that the illustrated clients 706 and computing architectures illustrated and described herein are illustrative and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for implementing aspects of the functionality disclosed herein. It should be understood that this configuration is illustrative and should not be construed as being limiting in any way. The application servers 708 can also host or provide access to one or more portals, link pages, Web sites, and/or other information ("web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") and presence services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/ or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like.

In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the TWITTER messaging service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein. For instance, any one of the application servers 708 may communicate or facilitate the functionality and features described herein. For instance, a social networking application, mail client, messaging client or a browser running on a phone or any other client 706 may communicate with a social networking service 722 and facilitate the functionality, even in part, described above with respect to FIG. 7. Any device or service depicted herein can be used as a resource for supplemental data, including email servers, storage servers, etc.

As shown in FIG. 7, the application servers 708 also can host other services, applications, portals, and/or other resources ("other resources") 724. The other resources 724 can include, but are not limited to, document sharing, rendering or any other functionality. It thus can be appreciated that the computing environment 702 can provide integration of the concepts and technologies disclosed herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 7, the datastores 726 also can host or store web page documents, word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should also be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects. In one specific example, as summarized above, techniques described herein may be implemented, at least in part, by a web browser application, which works in conjunction with the application servers 708 of FIG. 7.

Turning now to FIG. 8, an illustrative computing device architecture 800 for a computing device that is capable of executing various software components described herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the computing devices shown in FIGS. 1A-3B. Moreover, aspects of the computing device architecture 800 may be applicable to traditional desktop computers, portable computers (e.g., phones, laptops, notebooks, ultra-portables, and netbooks), server computers, and other computer systems, such as those described herein. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can interact to carry out device functions. In some configurations, the components are arranged so as to communicate via one or more buses (not shown in FIG. 8).

The processor 802 includes a processor 802 configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high-resolution video (e.g., 720P, 1080P, and higher resolution), video games, 3D modeling applications, and the like. In some configurations, the processor 802 is configured to communicate with a discrete GPU (also not shown in FIG. 8). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a RAM 814, a ROM 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 704 of FIG. 7. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

Example Clause A, a computer-implemented method for processing votes (114) for content (110) shared in a multi-user sharing session (100), the method comprising: causing the content (110) to be displayed to a plurality of users (102) in the multi-user sharing session (100); receiving the votes (114) from the plurality of users (102), wherein each vote (114) is based on a digital ink input gesture made by individual users (102A) of the plurality of users (102), wherein the digital ink input gesture identifies a portion of the content and a preference for the portion of the content (110); analyzing the votes (114) to determine a priority for the portion of the content (110); and modifying a display of the portion of the content (110) based on the priority for the portion of the content (110).

Example Clause B, the computer-implemented method of Clause A, wherein modifying the display of the content comprises rearranging the content based on the priority for the portion of the content.

Example Clause C, the computer-implemented method of any of Clauses A or B, wherein modifying the display of the content comprises deleting the portion of the content if the portion of the content has a priority not exceeding a threshold.

Example Clause D, the computer-implemented method of any of Clauses A-C, wherein modifying the display of the content comprises generating an annotation indicating the preference for the portion of the content.

Example Clause E, the computer-implemented method of any of Clauses A-D, wherein modifying the display of the content comprises adding a user interface (UI) element to the content to bring focus to the portion of the content if the portion of the content has a priority exceeding a threshold.

Example Clause F, the computer-implemented method of any of Clauses A-E, wherein the multi-user sharing session comprises a three-dimensional (3D) collaborative workspace and wherein the portion of the content comprises virtual objects displayed in a mixed reality computing environment.

Example Clause G, the computer-implemented method of any of Clauses A-F, wherein modifying the display of the content comprises gradually modifying a visual attribute of the portion of the content as the votes are received from the plurality of users.

Example Clause H, the computer-implemented method of any of Clauses A-G, further comprising weighting the votes received from the plurality of users prior to determining the priority for the portion of the content, the weighting based at least in part on a context associated with each of the plurality of users.

Example Clause I, a system, comprising: one or more processing units (602); and a computer-readable storage medium (612) having computer-executable instructions encoded thereon to cause the one or more processing units (602) to cause a display of a digital whiteboard to a plurality of users (102), the digital whiteboard comprising a plurality of whiteboard objects, receive a plurality of votes (114) from the users (102), where each vote (114) is based on an input gesture received from an individual user (102A) of the plurality of users (114), the input gesture of the individual user (102A) identifying one or more whiteboard objects and a preference for the identified whiteboard objects; analyze the votes (114) to determine a priority for the plurality of whiteboard objects; and modify the display of the digital whiteboard based on the priority.

Example Clause J, the system of Clause I, wherein the modification of the display of the digital whiteboard comprises rearranging the plurality of whiteboard objects based on the priority for the plurality of whiteboard objects.

Example Clause K, the system of Clauses I or J, wherein the modification of the display of the digital whiteboard comprises deleting one or more whiteboard objects having a priority that does not meet a threshold.

Example Clause L, the system of any of Clauses I-K, wherein the modification of the display of the digital whiteboard comprises generating an annotation indicating preferences of individual whiteboard objects.

Example Clause M, the system of any of Clauses I-L, wherein the computer-readable storage medium has further computer-executable instructions encoded thereon to generate an audio output describing the modification of the display of the digital whiteboard.

Example Clause N, the system of any of Clauses I-M, wherein the computer-readable storage medium has further computer-executable instructions encoded thereon to receive at least one of the votes from a machine learning component.

Example Clause O, a computer-readable storage medium (612) having computer-executable instructions encoded thereupon which, when executed, cause one or more processing units (602) to: cause content (110) to be displayed to a plurality of users (102) in a multi-user sharing session (100); receive votes (114) from the plurality of users (102), wherein each vote (114) is based on an input gesture made by individual users (102A) of the plurality of users (102), the input gesture of each individual user (102A) indicating a preference for a portion of the content (110); analyze the votes (114) to determine a priority for the portion of the content (110); and modify a display of the content (110) based on the priority for the portion of the content (110) by rearranging the content (110), deleting the portion of the content (110) if the portion of the content (110) has a priority not exceeding a threshold, generating an annotation indicating the preference for the portion of the content (110), or adding a user interface (UI) element to the content (110) to bring focus to the portion of the content (110) if the portion of the content (110) has a priority exceeding a threshold.

Example Clause P, the computer-readable storage medium of Clause O, wherein the multi-user sharing session comprises a three-dimensional (3D) collaborative workspace and wherein the portion of the content comprises virtual objects displayed in a mixed reality computing environment.

Example Clause Q, the computer-readable storage medium of Clauses O or P, wherein the multi-user sharing session comprises a digital whiteboard and wherein the portion of content comprises a whiteboard objects displayed on the digital whiteboard.

Example Clause R, the computer-readable storage medium of any of Clauses O-Q, having further computer-executable instructions encoded thereupon to generate a report indicating the preferences for the portion of the content.

Example Clause S, the computer-readable storage medium of any of Clauses O-R having further computer-executable instructions encoded thereupon to weight the votes received from the plurality of users prior to determining the priority for the portion of the content, the weighting based at least in part on a context associated with each of the plurality of users.

Example Clause T, the computer-readable storage medium of any of Clauses O-S, wherein the computer-readable storage medium has further computer-executable instructions encoded thereon to receive at least one of the votes from a machine learning component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

The invention claimed is:

1. A computer-implemented method for modifying content in a multi-user sharing session, the method comprising:
causing the content to be displayed on a plurality of computing devices associated with a plurality of users in the multi-user sharing session;
receiving an input from individual users of the plurality of users indicating a modification to the content displayed on the plurality of devices, wherein the modification of the content by each user indicates a vote for the modification, wherein the input is from a subset of computing devices of a subset of users indicating a deletion of a portion of the content;
analyzing a number of the votes to determine if the number of the votes meets one or more criteria, wherein the number of the votes based on one or more modifications to the content is analyzed for determining a level of brightness associated with the content; and
in response to determining that two or more votes of the number of the votes meets the one or more criteria, modifying the display of the content with the level of brightness that indicates the number of the votes, wherein the one or more modifications to the content includes deleting the portion of the content, and after the modifying the display, in response to the one or more inputs from the subset of users exceeding a threshold, deleting the portion of the content that is displayed on computing devices of each of the plurality of users.

2. The computer-implemented method of claim 1, wherein modifying the display of the content comprises adding a user interface (UI) element to the content to bring focus to the portion of the content if the portion of the content has a priority exceeding a threshold.

3. The computer-implemented method of claim 1, further comprising weighting the votes received from the plurality of users prior to determining the priority for the portion of the content, the weighting based at least in part on a context associated with each of the plurality of users.

4. The computer-implemented method of claim 1, wherein the level of brightness is reduced in response to determining that the number of votes is below the threshold.

5. The computer-implemented method of claim 1, wherein the one or more criteria comprises a plurality of thresholds for the votes, wherein the level of brightness is modified to a first level of brightness when the number of votes exceeds a first threshold of the plurality of thresholds, and wherein the level of brightness is modified to a second level of brightness when the number of votes exceeds a second threshold of the plurality of thresholds.

6. The computer-implemented method of claim 1, wherein the number of votes is based on a number of modifications to the content.

7. The computer-implemented method of claim 1, wherein the one or more inputs from the subset of computing devices cause a generation of a graphical element indicating a selection of a portion of the content, wherein a threshold number of graphical elements positioned over the portion of the content causes the modification to the display of the content, wherein modifying the display of the content includes deleting the portion of the content from the content that is displayed on computing devices of each of the plurality of users.

8. A system, comprising:
one or more processing units; and
a computer-readable storage medium having computer-executable instructions encoded thereon to cause the one or more processing units to
cause a display of a digital whiteboard to a plurality of users, the digital whiteboard comprising a plurality of whiteboard objects,
receive an input from individual users of the plurality of users indicating a modification to the content displayed on the plurality of devices, where the modification of the content by each user indicated a vote for the modification, wherein the input is from a subset of computing devices of a subset of users indicating a deletion of a portion of the content;
analyze a number of the votes to determine if the number of the votes meets one or more criteria, wherein the number of the votes based on one or more modifications to the content is analyzed for determining a level of brightness associated with the content; and
in response to determining that two or more votes of the number of the votes meets the one or more criteria, modify the display of the digital whiteboard with the level of brightness that indicates the number of the votes, wherein the one or more modifications to the content includes deleting the portion of the content, and after the modifying the display, in response to the one or more inputs from the subset of users exceeding a threshold, deleting the portion of the content that is displayed on computing devices of each of the plurality of users.

9. The system of claim 8, wherein the modification of the display of the digital whiteboard comprises deleting one or more whiteboard objects having a priority that does not meet the threshold.

10. The system of claim 8, wherein the modification of the display of the digital whiteboard comprises generating an annotation indicating preferences of individual whiteboard objects.

11. A computer-readable storage medium having computer-executable instructions encoded thereupon which, when executed, cause one or more processing units to:
cause content to be displayed on a plurality of computing devices associated with a plurality of users in a multi-user sharing session;
receive an input from individual users of the plurality of users indicating a modification to the content displayed on the plurality of devices, wherein the modification of the content by each user indicates a vote for the modification, wherein the input is from a subset of computing devices of a subset of users indicating a deletion of a portion of the content;
analyze a number of the votes to determine if the number of the votes meets one or more criteria, wherein the number of the votes based on one or more modifications to the content is analyzed for determining a level of brightness associated with the content; and
in response to determining that two or more votes of the number of the votes meets the one or more criteria, modify the display of the content by rearranging the content, deleting the portion of the content if the portion of the content has a priority not exceeding a threshold, generating an annotation indicating the preference for the portion of the content, or modify the display of the content with the level of brightness that indicates the number of the votes, wherein the one or more modifications to the content includes deleting the portion of the content, and after the modifying the display, in response to the one or more inputs from the subset of users exceeding a threshold, deleting the portion of the content that is displayed on computing devices of each of the plurality of users.

12. The computer-readable storage medium of claim 11, wherein the multi-user sharing session comprises a three-dimensional (3D) collaborative workspace and wherein the portion of the content comprises virtual objects displayed in a mixed reality computing environment.

13. The computer-readable storage medium of claim 11, having further computer-executable instructions encoded thereupon to generate a report indicating the preferences for the portion of the content.

14. The computer-readable storage medium of claim 11, having further computer-executable instructions encoded thereupon to weight the votes received from the plurality of users prior to determining the priority for the portion of the content, the weighting based at least in part on a context associated with each of the plurality of users.

15. The computer-readable storage medium of claim 11, wherein the computer-readable storage medium has further computer-executable instructions encoded thereon to receive at least one of the votes from a machine learning component.

* * * * *